(12) United States Patent
Kim

(10) Patent No.: US 12,431,954 B2
(45) Date of Patent: Sep. 30, 2025

(54) METHOD AND DEVICE FOR BEAM-RELATED OPERATION OF DEVICE IN WIRELESS COMMUNICATION SYSTEM

(71) Applicant: LG ELECTRONICS INC., Seoul (KR)

(72) Inventor: Youngdae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 18/691,721

(22) PCT Filed: Sep. 17, 2021

(86) PCT No.: PCT/KR2021/012874
§ 371 (c)(1),
(2) Date: Mar. 13, 2024

(87) PCT Pub. No.: WO2023/042942
PCT Pub. Date: Mar. 23, 2023

(65) Prior Publication Data
US 2024/0388352 A1 Nov. 21, 2024

(51) Int. Cl.
*H04B 7/06* (2006.01)
*H04B 7/0408* (2017.01)
(Continued)

(52) U.S. Cl.
CPC ....... *H04B 7/06952* (2023.05); *H04B 7/0408* (2013.01); *H04B 7/0617* (2013.01); *H04W 72/0453* (2013.01); *H04W 72/046* (2013.01)

(58) Field of Classification Search
CPC H04B 7/06952; H04B 7/0408; H04B 7/0617; H04W 72/0453; H04W 72/046
See application file for complete search history.

(56) References Cited

U.S. PATENT DOCUMENTS

2019/0253119 A1* 8/2019 Lo .............. H04B 7/0695
2020/0177256 A1* 6/2020 Cha ............. H04B 7/0695
(Continued)

FOREIGN PATENT DOCUMENTS

| JP | 2020-509654 | 3/2020 |
| KR | 10-2016-0147499 | 12/2016 |
| KR | 10-2020-0062201 | 6/2020 |

OTHER PUBLICATIONS

PCT International Application No. PCT/KR2021/012874, International Search Report dated Jun. 7, 2022, 3 pages.
(Continued)

*Primary Examiner* — Jaison Joseph
(74) *Attorney, Agent, or Firm* — LEE, HONG, DEGERMAN, KANG & WAIMEY

(57) ABSTRACT

Provided are a method for operating a device in a wireless communication system, and a device using the method. The method comprises: measuring a plurality of reference beams; selecting at least one beam from among the plurality of reference beams; and communicating with a base station using the at least one selected beam, wherein the plurality of reference beams are beams transmitted according to a first scheme or a second scheme. In the first scheme, N (N is a natural number greater than or equal to two) reference beams are transmitted at a first transmission time, and an offset is applied to the N reference beams at a second transmission time. In the second scheme, 2N reference beams are transmitted, wherein a second frequency interval between adjacent beams of the 2N reference beams is half a first frequency interval between adjacent beams of the N reference beams.

14 Claims, 25 Drawing Sheets

(51) Int. Cl.
H04W 72/044 (2023.01)
H04W 72/0453 (2023.01)

(56) References Cited

U.S. PATENT DOCUMENTS

| | | | |
|---|---|---|---|
| 2020/0413392 A1* | 12/2020 | Purkayastha | H04W 36/0088 |
| 2022/0368436 A1* | 11/2022 | Abedini | H04B 7/0619 |
| 2023/0105291 A1* | 4/2023 | Abedini | H04W 74/0841 370/329 |
| 2023/0115394 A1* | 4/2023 | Abedini | H04W 48/12 370/503 |

OTHER PUBLICATIONS

3rd Generation Partnership Project, "Technical Specification Group Radio Access Network; NR; User Equipment (UE) procedures in Idle mode and RRC Inactive state (Release 16)," 3GPP TS 38.304 V16.5.0, Jul. 2021, 41 pages.

* cited by examiner

METHOD AND DEVICE FOR BEAM-RELATED OPERATION OF DEVICE IN WIRELESS COMMUNICATION SYSTEM

CROSS-REFERENCE TO RELATED APPLICATION(S)

This application is the National Stage filing under 35 U.S.C. 371 of International Application No. PCT/KR2021/012874, filed on Sep. 17, 2021, the contents of which are all hereby incorporated by reference herein in its entirety.

TECHNICAL FIELD

The present disclosure relates to a beam-related operating method and device in a wireless communication system.

BACKGROUND

3rd Generation Partnership Project (3GPP) Long-Term Evolution (LTE) is a technology to enable high-speed packet communication. Many methods have been proposed to achieve the LTE goals of reducing costs for users and operators, improving service quality, expanding coverage, and increasing system capacity. 3GPP LTE requires lower cost per bit, improved service usability, flexible use of frequency bands, simple structure, open interface, and appropriate power consumption of the user equipment (UE) as high-level requirements.

Work has begun at the International Telecommunication Union (ITU) and 3GPP to develop requirements and specifications for New Radio (NR) systems. 3GPP needs to identify and develop the technical components required to successfully standardize NR that satisfies both urgent market needs and the longer-term requirements set out by the ITU Radio Communication Sector (ITU-R) International Mobile Telecommunications (IMT)-2020 process in a timely manner. Additionally, NR should be able to use any spectrum band up to at least 100 GHZ, which can be used for wireless communications even in the distant future.

NR targets a single technology framework that covers all deployment scenarios, usage scenarios, and requirements, including enhanced Mobile BroadBand (eMBB), massive Machine Type-Communications (mMTC), Ultra-Reliable and Low Latency Communications (URLLC), and more. NR should be inherently forward compatible.

With the commercialization of NR, which is the 5th generation (5G) mobile communication technology, research on the 6th generation (6G) mobile communication technology is beginning. The 6th generation mobile communication technology is expected to utilize a frequency band of 100 GHz or higher. Accordingly, it is expected that the available frequency can be increased by more than 10 times compared to 5G, and the possibility of utilizing space resources can be further increased. This frequency band above 100 GHz may be referred to as sub-terahertz (sub-THz).

Wireless communication systems are being widely deployed to provide various kinds of communication services such as voice and data. In general, wireless communication systems are multiple access systems that can support communication with multiple users by sharing available system resources (bandwidth, transmission power, etc.). Examples of multiple access systems include Code Division Multiple Access (CDMA), Frequency Division Multiple Access (FDMA), Time Division Multiple Access (TDMA), Space Division Multiple Access (SDMA), Orthogonal Frequency Division Multiple Access (OFDMA), Single Carrier Frequency Division Multiple Access (SC-FDMA), and Interleave Division Multiple Access (IDMA).

SUMMARY

The present disclosure seeks to provide a method of operating a plurality of beams in a wireless communication system and a device using the same.

In one aspect, provided is a method of operating a user equipment (UE) in a wireless communication system. The method includes measuring a plurality of reference beams in a frequency domain, selecting at least one beam of the plurality of reference beams, and communicating with a base station using the selected at least one beam. The plurality of reference beams are beams transmitted based on a first scheme or a second scheme. The first scheme comprises transmitting N, the N being a natural number greater than or equal to 2, reference beams at a first transmission time and transmitting the N reference beams with an offset at a second transmission time, and the second scheme comprises transmitting 2N reference beams and a second frequency spacing between adjacent beams in the 2N reference beams is half of a first frequency spacing between adjacent beams in the N reference beams.

In another aspect, provided is a user equipment (UE) performing in a wireless communication system. The UE includes at least one transceiver, at least one memory and at least one processor operably coupled to the at least one memory. The at least one processor is adapted to measure a plurality of reference beams in a frequency domain, select at least one beam of the plurality of reference beams and communicate with a base station using the selected at least one beam. The plurality of reference beams are beams transmitted based on a first scheme or a second scheme. The first scheme comprises transmitting N, the N being a natural number greater than or equal to 2, reference beams at a first transmission time and transmitting the N reference beams with an offset at a second transmission time, and the second scheme comprises transmitting 2N reference beams and a second frequency spacing between adjacent beams in the 2N reference beams is half of a first frequency spacing between adjacent beams in the N reference beams.

In still another aspect, provided is a processing device operating in a wireless communication system. The processing device includes at least one processor and at least one memory operably coupled to the at least one processor. The at least one processor is adapted to measure a plurality of reference beams in a frequency domain, select at least one beam of the plurality of reference beams and communicate with a base station using the selected at least one beam. The plurality of reference beams are beams transmitted based on a first scheme or a second scheme. The first scheme comprises transmitting N, the N being a natural number greater than or equal to 2, reference beams at a first transmission time and transmitting the N reference beams with an offset at a second transmission time, and the second scheme comprises transmitting 2N reference beams and a second frequency spacing between adjacent beams in the 2N reference beams is half of a first frequency spacing between adjacent beams in the N reference beams.

In still another aspect, provided is a computer readable medium (CRM) storing instructions that cause an operation to be performed by at least one processor, where the operation includes measuring a plurality of reference beams in a frequency domain, selecting at least one beam of the plurality of reference beams, and communicating with a base station using the selected at least one beam. The plurality of reference beams are beams transmitted based on a first scheme or a second scheme. The first scheme comprises transmitting N, the N being a natural number greater than or equal to 2, reference beams at a first transmission time and transmitting the N reference beams with an offset at a second transmission time, and the second scheme comprises transmitting 2N reference beams and a second frequency spacing between adjacent beams in the 2N reference beams is half of a first frequency spacing between adjacent beams in the N reference beams.

In still another aspect, provided is a method of operating a base station in a wireless communication system. The method includes transmitting a plurality of reference beams in a frequency domain, and communicating with a user equipment (UE) using selected at least one beam among the plurality of reference beams. The plurality of reference beams are beams that the base station transmits based on a first scheme or a second scheme. The first scheme comprises transmitting N, the N being a natural number greater than or equal to 2, reference beams at a first transmission time and transmitting the N reference beams with an offset at a second transmission time, and the second scheme comprises transmitting 2N reference beams and a second frequency spacing between adjacent beams in the 2N reference beams is half of a first frequency spacing between adjacent beams in the N reference beams.

In still another aspect, provided is a base station operating in a wireless communication system. The base station includes at least one transceiver, at least one memory, and at least one processor operably coupled to the at least one memory. The at least one processor is adapted to transmit a plurality of reference beams in a frequency domain, and communicate with a user equipment (UE) using selected at least one beam among the plurality of reference beams. The plurality of reference beams are beams that the base station transmits based on a first scheme or a second scheme. The first scheme comprises transmitting N, the N being a natural number greater than or equal to 2, reference beams at a first transmission time and transmitting the N reference beams with an offset at a second transmission time, and the second scheme comprises transmitting 2N reference beams and a second frequency spacing between adjacent beams in the 2N reference beams is half of a first frequency spacing between adjacent beams in the N reference beams.

The present disclosure may have a number of effects. The reference multi-beams can be used to efficiently determine the area of frequency resources that can be allocated to each UE. Furthermore, based on this, "configured grant transmission and reception" can be applied to use frequencies within the frequency resource area for the UE in the multi-beam transmission and reception duration of the base station, thereby increasing the efficiency of massive user connection. Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DETAILED DESCRIPTION

Figure 1:
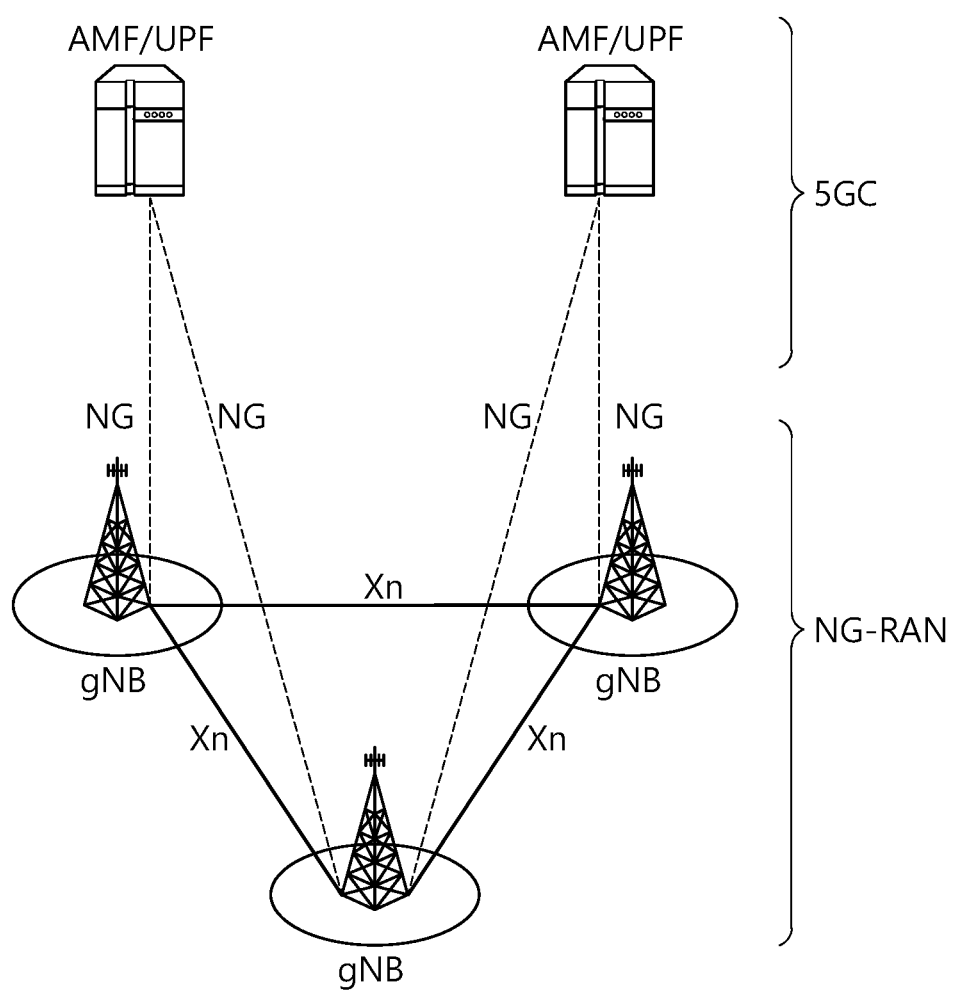
FIG. 1 illustrates the system structure of a New Generation Radio Access Network (NG-RAN) with NR.

The following techniques, devices and systems may be applied to a variety of wireless multiple access systems. Examples of multiple access systems include Code Division Multiple Access (CDMA) systems, Frequency Division Multiple Access (FDMA) systems, Time Division Multiple Access (TDMA) systems, Orthogonal Frequency Division Multiple Access (OFDMA) systems, and Single Access (SC-FDMA) systems. It includes a Carrier Frequency Division Multiple Access (MC-FDMA) system and a Multi-Carrier Frequency Division Multiple Access (MC-FDMA) system. CDMA can be implemented through wireless technologies such as Universal Terrestrial Radio Access (UTRA) or CDMA2000. TDMA can be implemented over wireless technologies such as Global System for Mobile communications (GSM), General Packet Radio Service (GPRS), or Enhanced Data rates for GSM Evolution (EDGE). OFDMA can be implemented through wireless technologies such as Institute of Electrical and Electronics Engineers (IEEE) 802.11 (Wi-Fi), IEEE 802.16 (WiMAX), IEEE 802.20, or Evolved UTRA (E-UTRA). UTRA is part of the Universal Mobile Telecommunications System (UMTS). 3rd Generation Partnership Project (3GPP) Long-Term Evolution (LTE) is part of Evolved UMTS (E-UMTS) using E-UTRA. 3GPP LTE uses OFDMA in the downlink (DL) and SC-FDMA in the uplink (UL). The evolution of 3GPP LTE includes LTE-A (Advanced), LTE-A Pro, and/or 5G NR (New Radio).

For convenience of explanation, implementations herein are primarily described in relation to a 3GPP based wireless communication system. However, the technical features of this specification are not limited to this. For example, the following detailed description is provided based on a mobile communication system corresponding to a 3GPP-based wireless communication system, but aspects of the present specification that are not limited to a 3GPP-based wireless communication system can be applied to other mobile communication systems.

For terms and technologies not specifically described among the terms and technologies used in this specification, reference may be made to wireless communication standard documents published prior to this specification.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one drawing in this specification may be implemented individually or simultaneously.

Although not limited thereto, various descriptions, functions, procedures, suggestions, methods and/or operational flow diagrams disclosed herein may be applied to various fields requiring wireless communication and/or connectivity (e.g., 5G) between devices.

Hereinafter, this specification will be described in more detail with reference to the drawings. In the following drawings and/or descriptions, like reference numbers may refer to identical or corresponding hardware blocks, software blocks and/or functional blocks, unless otherwise indicated.

The following technologies can be used in various wireless access systems such as CDMA, FDMA, TDMA, OFDMA, SC-FDMA, etc. CDMA can be implemented with wireless technologies such as Universal Terrestrial Radio Access (UTRA) or CDMA2000. TDMA can be implemented with wireless technologies such as Global System for Mobile communications (GSM)/General Packet Radio Service (GPRS)/Enhanced Data Rates for GSM Evolution (EDGE). OFDMA can be implemented with wireless technologies such as IEEE 802.11 (Wi-Fi), IEEE 802.16 (WiMAX), IEEE 802-20, Evolved UTRA (E-UTRA), etc. UTRA is part of the Universal Mobile Telecommunications System (UMTS). 3rd Generation Partnership Project (3GPP) Long Term Evolution (LTE) is part of Evolved UMTS (E-UMTS) using E-UTRA, and LTE-A (Advanced)/LTE-A pro is an evolved version of 3GPP LTE. 3GPP NR (New Radio or New Radio Access Technology) is an evolved version of 3GPP LTE/LTE-A/LTE-A pro. 3GPP 6G may be an evolved version of 3GPP NR.

For clarity of explanation, the description is based on a 3GPP communication system (e.g., LTE, NR, etc.), but the technical idea of the present disclosure is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to technology after TS 38.xxx Release 15. 3GPP 6G may refer to technologies after TS Release 17 and/or Release 18. "xxx" refers to the standard document detail number. LTE/NR/6G can be collectively referred to as a 3GPP system. Regarding background technology, terms, abbreviations, etc. used in the description of the present disclosure, reference may be made to matters described in standard documents published prior to the present disclosure.

NR supports multiple numerologies or subcarrier spacing (SCS) to support various 5G services. For example, if SCS is 15 kHz, it supports a wide area in traditional cellular bands, and if SCS is 30 kHz/60 kHz, it supports dense-urban, lower latency, and wider areas. It supports a wider carrier bandwidth, and when SCS is 60 KHz or higher, it supports a bandwidth greater than 24.25 GHz to overcome phase noise.

The NR frequency band can be defined as two types of frequency ranges (FR1, FR2). The values of the frequency range may vary. For example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be referred to as MilliMeter Wave (mmW).

TABLE 1

| Frequency range designation | Frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHZ, etc.). For example, the frequency band above 6 GHz (or 5850, 5900, 5925 MHZ, etc.) included within FR1 may include an unlicensed band. Unlicensed bands can be used for a variety of purposes, for example for communications for vehicles (e.g. autonomous driving).

TABLE 2

| Frequency range designation | Frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

Here, wireless communication technologies implemented in the wireless device of this specification may include NarrowBand IoT (NB-IoT) for low-power communication as well as LTE, NR, and 6G. For example, NB-IoT technology may be an example of LPWAN (Low Power Wide Area Network) technology and may be implemented in standards such as LTE Cat NB1 and/or LTE Cat NB2, and is not limited to the above-mentioned names. Additionally or alternatively, the wireless communication technology implemented in the wireless device of the present specification may perform communication based on LTE-M technology. For example, LTE-M technology may be an example of LPWAN technology and may be called various names such as enhanced MTC (eMTC). For example, LTE-M technology may be implemented in at least one of a variety of specifications, including 1) LTE CAT 0, 2) LTE Cat M1, 3) LTE Cat M2, 4) LTE non-Bandwidth Limited (non-BL), 5) LTE-MTC, 6) LTE MTC, and/or 7) LTE M, and is not limited to the above designations. Additionally or alternatively, the wireless communication technologies implemented in the wireless devices of the present disclosure may include at least one of ZigBee, Bluetooth, and/or LPWAN with consideration for low power communication, and are not limited to the above designations. For example, Zigbee technology can create Personal Area Networks (PANs) for small/low-power digital communications based on various specifications such as IEEE 802.15.4, which can go by many names.

FIG. 1 illustrates the system structure of a next-generation radio access network (NG-RAN) to which NR is applied.

Referring to FIG. 1, NG-RAN may include a gNB and/or eNB that provide user plane and control plane protocol termination to the UE. FIG. 1 illustrates a case including only gNB. gNB and eNB are connected to each other through the Xn interface. The gNBs and eNBs are connected with the 5G Core Network (5GC) via NG interfaces. More specifically, the access and mobility management function (AMF) is connected via the NG-C interface, and the user plane function (UPF) is connected via the NG-U interface.

Figure 2:
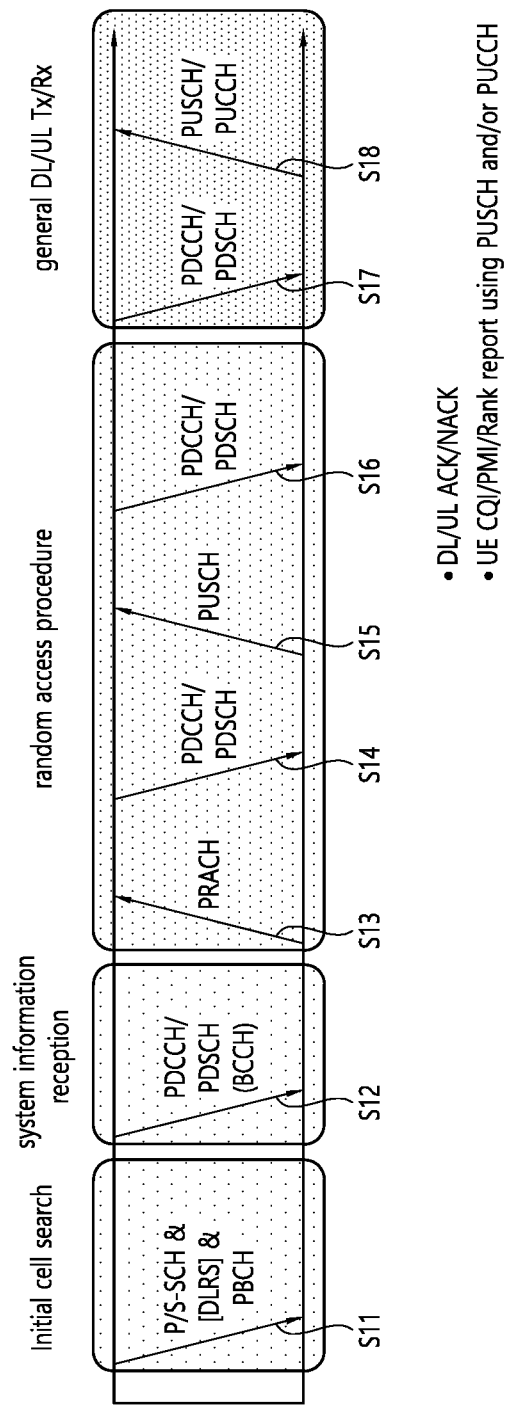
FIG. 2 illustrates the physical channels utilized in a 3GPP system and typical signal transmission.

FIG. 2 illustrates physical channels and typical signal transmission used in a 3GPP system. In a wireless communication system, a UE receives information from a base station through downlink (DL), and the UE transmits information to the base station through uplink (UL). The information transmitted and received between the base station and the UE includes data and various control information, and various physical channels exist depending on the type/purpose of the information they transmit and receive.

The UE which is powered on or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Meanwhile, if there are no radio resources to connect to the base station for the first time or to transmit a signal, the UE may perform a random access procedure (RACH) to the base station (S13 to S16). To do this, the UE may transmit a specific sequence as a preamble over the Physical Random Access Channel (PRACH) (S13 and S15) and receive a response message (Random Access Response (RAR) message) to the preamble over the PDCCH and the corresponding PDSCH. In the case of contention-based RACH, an additional conflict resolution procedure can be performed (S16).

After performing the procedure described above, the UE can then perform PDCCH/PDSCH reception (S17) and Physical Uplink Shared Channel (PUSCH)/Physical Uplink Control Channel (PUCCH) transmission (S18) as a normal uplink signal transmission procedure. In particular, the UE may receive downlink control information (DCI) via PDCCH. The DCI includes control information, such as resource allocation information for the UE, and may be formatted differently depending on the intended use.

On the other hand, the control information transmitted by the UE to the base station via the uplink or received by the UE from the base station may include downlink/uplink ACK/NACK signals, channel quality indicators (CQI), precoding matrix indices (PMI), rank indicators (RI), etc. The UE may transmit control information such as CQI/PMI/RI described above via PUSCH and/or PUCCH.

<Structure of Uplink and Downlink Channels>

1. Downlink Channel Structure

The base station transmits related signals to the UE through a downlink channel described later, and the UE receives related signals from the base station through a downlink channel described later.

(1) Physical Downlink Shared Channel (PDSCH)

PDSCH carries downlink data (e.g., DL-shared channel transport block, DL-SCH TB) and is subject to modulation methods such as Quadrature Phase Shift Keying (QPSK), 16 Quadrature Amplitude Modulation (QAM), 64 QAM, 256 QAM, etc. A codeword is generated by encoding TB. PDSCH can carry multiple codewords. Each codeword is scrambled and modulation mapped, and the modulation symbols generated from each codeword are mapped to one or more layers (Layer mapping). Each layer is mapped to resources along with DMRS (Demodulation Reference Signal), generated as an OFDM symbol signal, and transmitted through the corresponding antenna port.

(2) Physical Downlink Control Channel (PDCCH)

PDCCH carries downlink control information (DCI) and QPSK modulation method is applied. One PDCCH consists of 1, 2, 4, 8, or 16 CCEs (Control Channel Elements) depending on the AL (Aggregation Level). One CCE consists of six REGs (Resource Element Group). One REG is defined by one OFDM symbol and one (P) RB.

The UE obtains DCI transmitted through the PDCCH by performing decoding (aka blind decoding) on a set of PDCCH candidates. The set of PDCCH candidates that the UE decodes is defined as the PDCCH search space set. The search space set may be a common search space or a UE-specific search space. The UE can obtain DCI by monitoring PDCCH candidates within one or more search space sets set by MIB or higher layer signaling.

2. Uplink Channel Structure

The UE transmits the relevant signals to the base station via the uplink channel described above, and the base station receives the relevant signals from the UE via the uplink channel described above.

(1) Physical Uplink Shared Channel (PUSCH)

PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE may transmit PUSCH based on the CP-OFDM waveform, and when transform precoding is possible (e.g., transform precoding is enabled), the UE may transmit PUSCH based on the CP-OFDM waveform or the DFT-s-OFDM waveform. PUSCH transmissions can be dynamically scheduled by UL grants within the DCI, or semi-statically scheduled based on higher layer (e.g., RRC) signaling (and/or Layer 1 (L1) signaling (e.g., PDCCH)) (configured grant). PUSCH transmission can be performed based on codebook or non-codebook.

(2) Physical Uplink Control Channel (PUCCH)

A PUCCH carries uplink control information, HARQ-ACKs and/or scheduling requests (SRs) and may be divided into multiple PUCCHs based on the length of the PUCCH transmission.

<6G System General>

The 6G (wireless communication) system is aimed at (i) very high data rates per device, (ii) a very large number of connected devices, (iii) global connectivity, (iv) very low latency, (v) lower energy consumption for battery-free IoT devices, (vi) ultra-reliable connectivity, and (vii) connected intelligence with machine learning capabilities. The vision of the 6G system can be four aspects, such as intelligent connectivity, deep connectivity, holographic connectivity, and ubiquitous connectivity, and the 6G system can satisfy the requirements as shown in Table 3 below. In other words, Table 3 is an example of the requirements of the 6G system.

TABLE 3

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| Artificial intelligence (AI) | Fully |
| Autonomous vehicle | Fully |
| Extended Reality (XR) | Fully |
| Haptic Communication | Fully |

6G systems may have key factors such as enhanced mobile broadband (eMBB), ultra-reliable low latency communications (URLLC), massive machine-type communication: (mMTC), AI integrated communication, tactile internet, high throughput, high network capacity, high energy efficiency, low backhaul and access network congestion, and enhanced data security.

Figure 3:
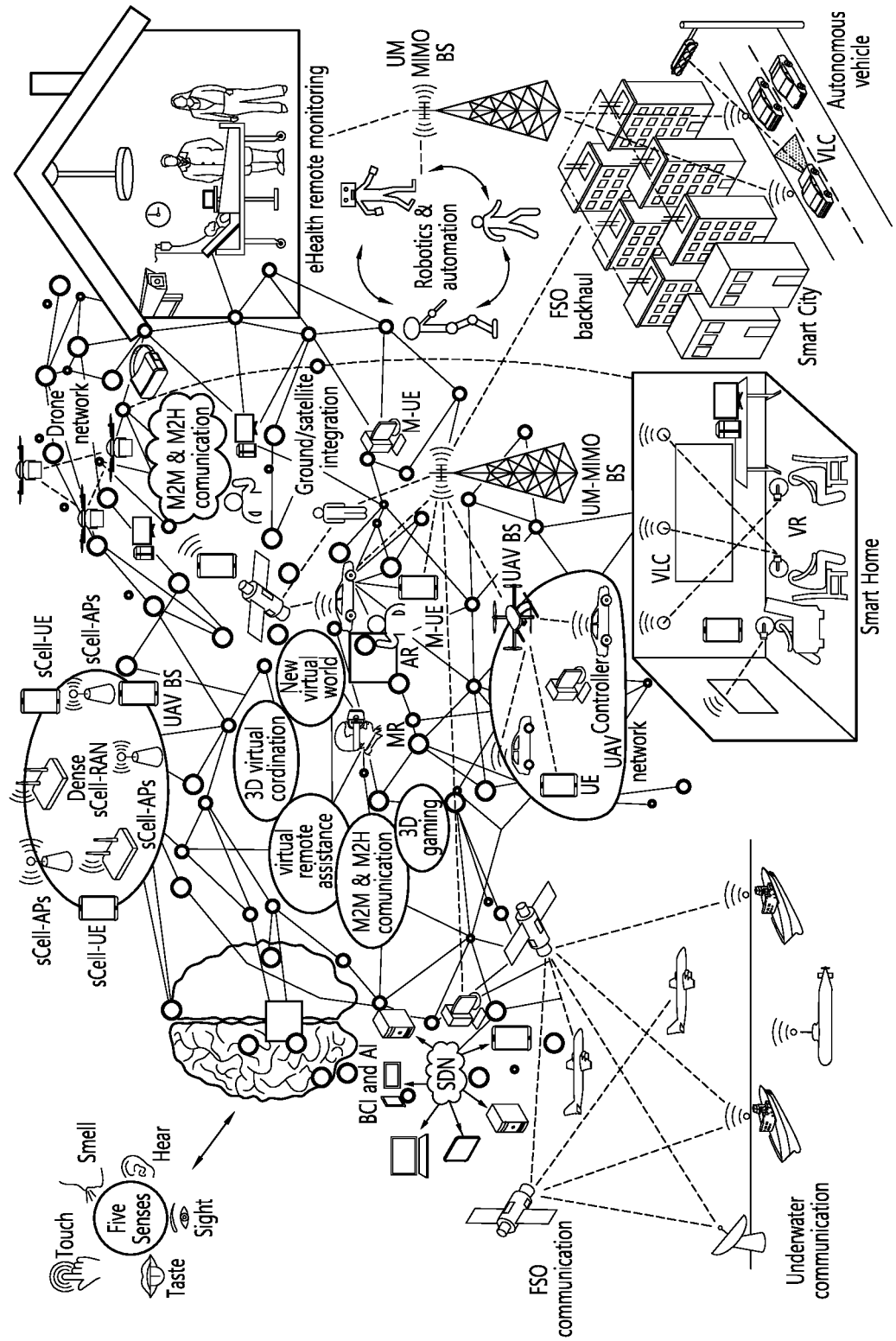
FIG. 3 illustrates an example of a communication structure that may be provided in a 6G system.

FIG. 3 is a diagram showing an example of a communication structure that can be provided in a 6G system.

The 6G system is expected to have simultaneous wireless communication connectivity that is 50 times higher than that of the 5G wireless communication system. URLLC, a key feature of 5G, will become an even more mainstream technology in 6G communications by providing end-to-end delays of less than 1 ms. The 6G system will have much better volumetric spectral efficiency, unlike the frequently used area spectral efficiency. 6G systems can offer very long battery life and advanced battery technologies for energy harvesting, so mobile devices will not need to be charged separately in a 6G system. New network characteristics in 6G may include:

Satellites integrated network: To provide a global mobile population, 6G is expected to be integrated with satellites. The integration of terrestrial, satellite, and airborne networks into a single wireless communication system is critical to 6G.

Connected intelligence: Unlike previous generations of wireless communication systems, 6G is revolutionary and will update the wireless evolution from "connected things" to "connected intelligence". AI can be applied at each step of the communication process (or each step of signal processing, as we will see later).

Seamless integration wireless information and energy transfer: 6G wireless networks will deliver power to charge the batteries of devices such as smartphones and sensors. Therefore, wireless information and energy transfer (WIET) will be integrated.

Ubiquitous super 3D connectivity: Access to networks and core network functions from drones and very low Earth orbit satellites will create super 3D connectivity at 6G ubiquity.

In the above new network characteristics of 6G, some general requirements may be as follows.

Small cell networks: The idea of small cell networks was introduced to improve the quality of received signals in cellular systems as a result of improved throughput, energy efficiency, and spectral efficiency. As a result, small cell networks are an essential characteristic for 5G and beyond 5G (5GB) communication systems. Therefore, 6G communication systems will also adopt the characteristics of small cell networks.

Ultra-dense heterogeneous networks: Ultra-dense heterogeneous networks will be another important characteristic of 6G communication systems. Multi-tier networks composed of heterogeneous networks will improve overall QoS and reduce costs.

High-capacity backhaul: Backhaul connectivity is characterized by high-capacity backhaul networks to support large volumes of traffic. High-speed fiber optics and free-space optics (FSO) systems are possible solutions to this problem.

Radar technology integrated with mobile technology: High-precision localization (or location-based services) over communications is one of the features of 6G wireless communication systems. Therefore, radar systems will be integrated with 6G networks.

Softwarization and virtualization: Softwarization and virtualization are two important features that are fundamental to the design process in a 5GB network to ensure flexibility, reconfigurability, and programmability. In addition, billions of devices may be shared on a shared physical infrastructure.

<Core Implementation Technology of 6G System>

1. Artificial Intelligence (AI)

The most important new technology that will be introduced in the 6G system is AI. The 4G system did not involve AI. 5G systems will support partial or very limited AI.

However, 6G systems will be AI-enabled for full automation. Advances in machine learning will create more intelligent networks for real-time communications in 6G. The introduction of AI in telecommunications can streamline and improve real-time data transmission. AI can use numerous analytics to determine how complex target tasks are performed, which means AI can increase efficiency and reduce processing delays.

Time-consuming tasks such as handover, network selection, and resource scheduling can be performed instantly by using AI. AI can also play an important role in machine-to-machine, machine-to-human, and human-to-machine communications. AI can also be a rapid communication in the brain computer interface (BCI). AI-based communication systems can be supported by metamaterials, intelligent structures, intelligent networks, intelligent devices, intelligent cognitive radios, self-sustaining wireless networks, and machine learning.

In recent years, there have been attempts to integrate AI with wireless communication systems, but these have been focused on the application layer, network layer, and especially in the area of wireless resource management and allocation. However, this research is increasingly moving to the MAC layer and physical layer, and there are attempts to combine deep learning with wireless transmission, especially in the physical layer. AI-driven physical layer transport means that the underlying signal processing and communication mechanisms are based on AI drivers rather than traditional communication frameworks. For example, it can include deep learning-based channel coding and decoding, deep learning-based signal estimation and detection, deep learning-based MIMO mechanisms, AI-based resource scheduling and allocation, etc.

Machine learning can be used for channel estimation and channel tracking, and can be used for power allocation, interference cancellation, etc. at the physical layer of the downlink. Machine learning can also be used for antenna selection, power control, symbol detection, etc. in MIMO systems. However, application of DNN for transmission in the physical layer may have the following problems.

AI algorithms based on deep learning require a lot of training data to optimize training parameters. However, due to the limitations of acquiring data in a specific channel environment as training data, a lot of training data is used offline. Static training on training data in a specific channel environment can lead to contradictions between the dynamic nature and diversity of the wireless channel.

In addition, current deep learning is mainly targeted at real signals. However, the signals at the physical layer of wireless communication are complex signals. Further research is needed on neural networks that detect complex domain signals to match the characteristics of wireless communication signals.

Below, machine learning is described in more detail.

Machine learning is the process of training a machine to do a task that humans can't or won't do. Machine learning requires data and learning models. In machine learning, there are three main ways to learn from data: supervised learning, unsupervised learning, and reinforcement learning.

Neural network training aims to minimize the error in the output. Neural network training is a process of repeatedly inputting training data into a neural network, calculating the error of the neural network's output and target for the training data, and updating the weights of each node of the neural network by backpropagating the error of the neural network from the output layer of the neural network to the input layer in the direction of reducing the error.

Supervised learning uses training data where the training data is labeled with the correct answer, while unsupervised learning may not have the training data labeled with the correct answer. This means that for example, for supervised learning on data classification, the training data may be data where each training data is labeled with a category. The labeled training data may be input to the neural network and an error may be calculated by comparing the output (category) of the neural network with the label of the training data. The calculated error is backpropagated in the neural network in the reverse direction (i.e., from the output layer to the input layer), and the connection weights of each node in each layer of the neural network may be updated according to the backpropagation. The amount of change in the connection weights of each node that is updated can be determined by the learning rate. The computation of the neural network on the input data and the backpropagation of errors may constitute a learning cycle (epoch). The learning rate may vary depending on the number of iterations of the learning cycle of the neural network. For example, a high learning rate can be used early in the training of a neural network to increase efficiency by allowing the neural network to quickly achieve a certain level of performance, and a low learning rate can be used later in the training to increase accuracy.

Depending on the nature of the data, the learning method may vary. For example, in a communication system, if the goal is to accurately predict the data transmitted by the sender at the receiver, it is preferable to perform training using supervised learning rather than unsupervised or reinforcement learning.

A learning model is the equivalent of the human brain, the most basic of which is a linear model, but the paradigm of machine learning that uses more complex neural network structures, such as artificial neural networks, as learning models is called deep learning.

The neural network core used as a learning method can be categorized into deep neural networks (DNNs), convolutional neural networks (CNNs), and recurrent neural networks (RNNs).

An artificial neural network is an example of connecting multiple perceptrons.

Figure 4:
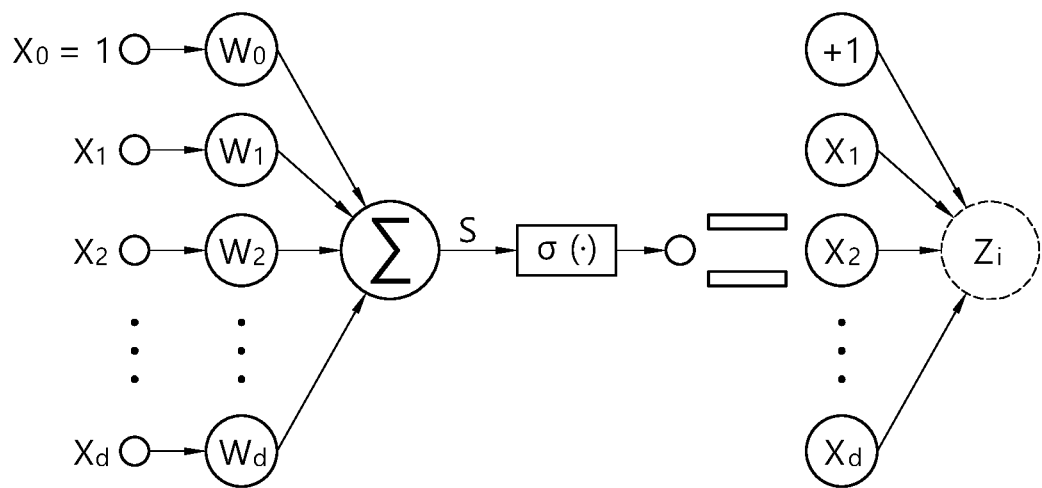
FIG. 4 illustrates a perceptron structure.

FIG. 4 illustrates a perceptron structure.

Referring to FIG. 4, given an input vector x=(x1, x2, ... , xd), the entire process of multiplying each component by a weight (W1, W2, ... , Wd), summing the results, and applying the activation function σ(•) is called a perceptron. Larger artificial neural network structures can extend the simplified perceptron structure shown in FIG. 4 to apply input vectors to different multi-dimensional perceptrons. For simplicity, inputs or outputs are referred to as nodes.

On the other hand, the perceptron structure shown in FIG. 4 can be described as consisting of a total of three layers based on input and output values. An artificial neural network with H (d+1) dimensional perceptrons between the first and second layers and K (H+1) dimensional perceptrons between the second and third layers can be represented as shown in FIG. 5.

Figure 5:
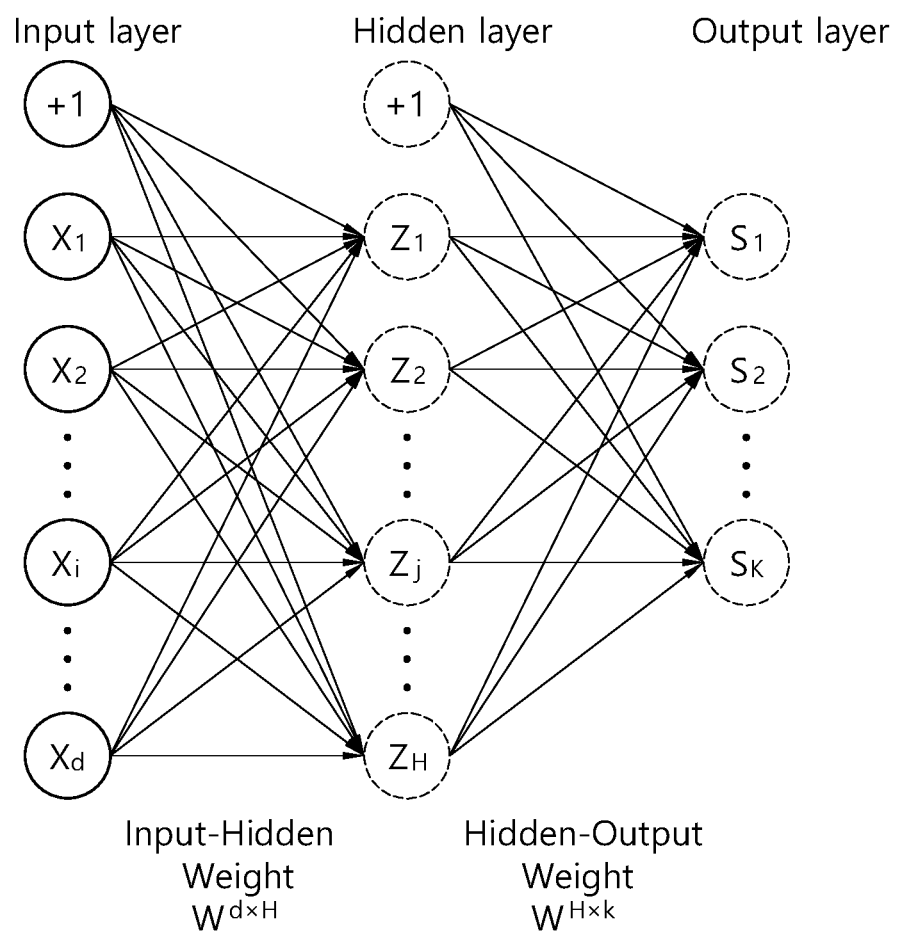
FIG. 5 illustrates a multilayer perceptron structure.

FIG. 5 illustrates a multilayer perceptron structure.

The layer where the input vector is located is called the input layer, the layer where the final output value is located is called the output layer, and all layers between the input and output layers are called hidden layers. The example in FIG. 5 shows three layers, but when counting the actual number of layers of an artificial neural network, the input layer is excluded and counted as two layers. The neural network is constructed by connecting the perceptrons of the basic block in two dimensions.

The input, hidden, and output layers described above can be applied jointly in various artificial neural network structures, such as CNNs and RNNs, as well as multilayer perceptrons. The more the number of hidden layers increases, the deeper the neural network becomes, and the machine learning paradigm that uses a sufficiently deep neural network as a learning model is called deep learning. Also, the artificial neural network used for deep learning is called a deep neural network (DNN).

Figure 6:
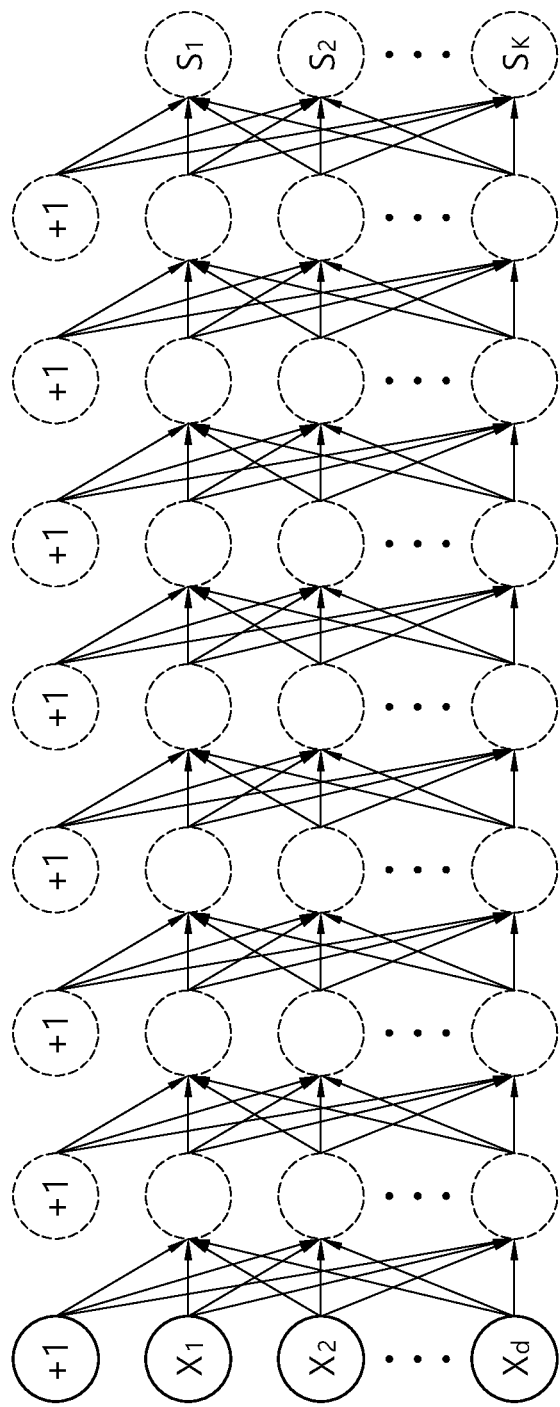
FIG. 6 illustrates a deep neural network.

FIG. 6 shows an example of a deep neural network.

The deep neural network shown in FIG. 6 is a multilayer perceptron with eight hidden layers and output layers. This multilayer perceptron structure is referred to as a fully-connected neural network. In a fully-connected neural network, there are no connections between nodes on the same layer, and only connections between nodes on neighboring layers. DNNs have a fully connected neural network structure and are composed of a combination of multiple hidden layers and activation functions, which can be usefully applied to characterize the correlation between inputs and outputs. Here, the correlation property can mean the joint probability of the input and output.

On the other hand, depending on how the multiple perceptrons are connected to each other, various artificial neural network structures can be formed that differ from the DNNs described above.

Figure 7:
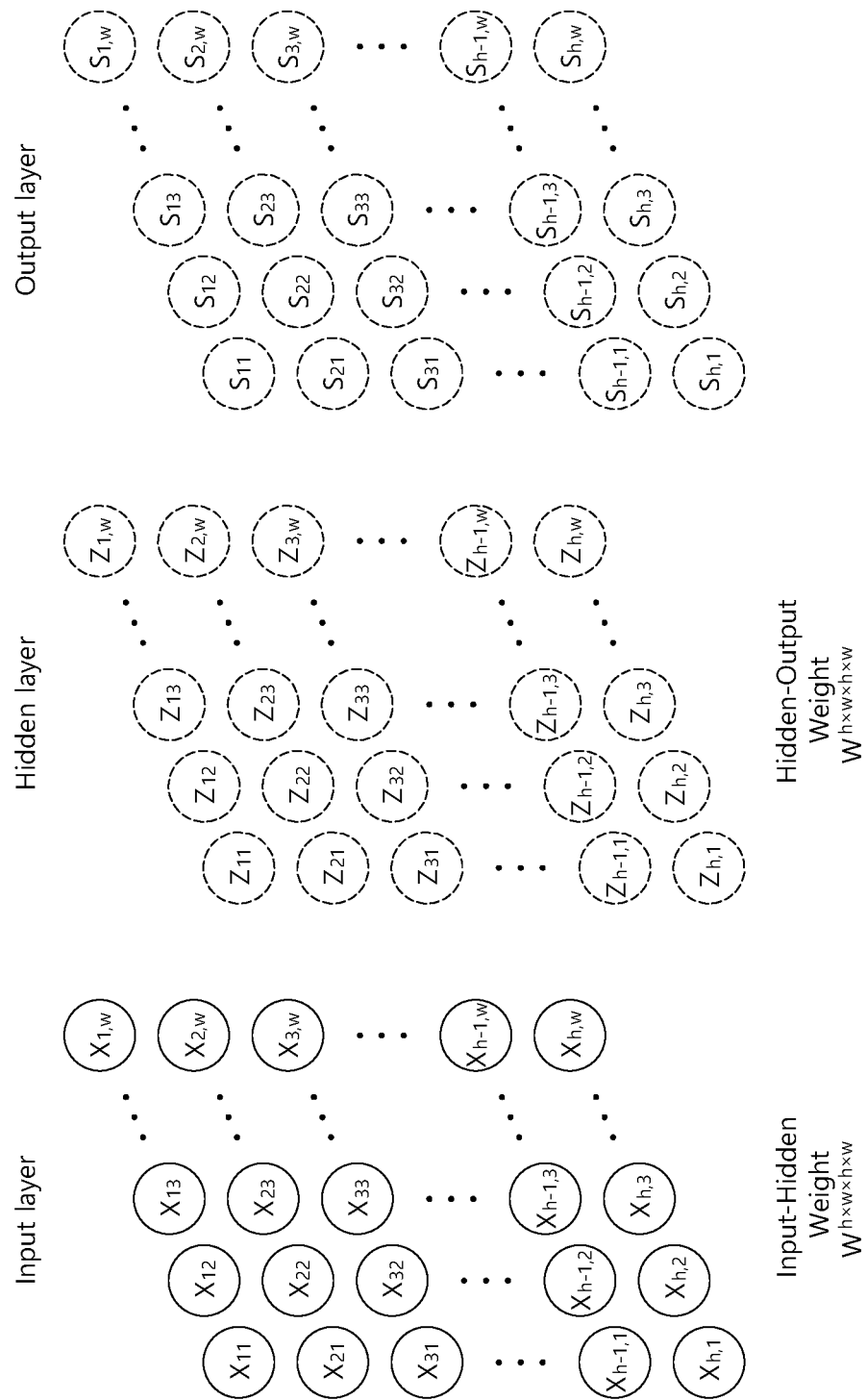
FIG. 7 illustrates a convolutional neural network.

FIG. 7 shows an example of a convolutional neural network.

In DNN, nodes located inside one layer are arranged in a one-dimensional vertical direction. However, in FIG. 7, it can be assumed that the nodes are arranged two-dimensionally with w nodes horizontally and h nodes vertically (convolutional neural network structure in FIG. 7). In this case, a weight is added to each connection during the connection process from one input node to the hidden layer, so a total of h×w weights should be considered. Since there are h×w nodes in the input layer, a total of $h^2w^2$ weights are needed between two adjacent layers.

Figure 8:
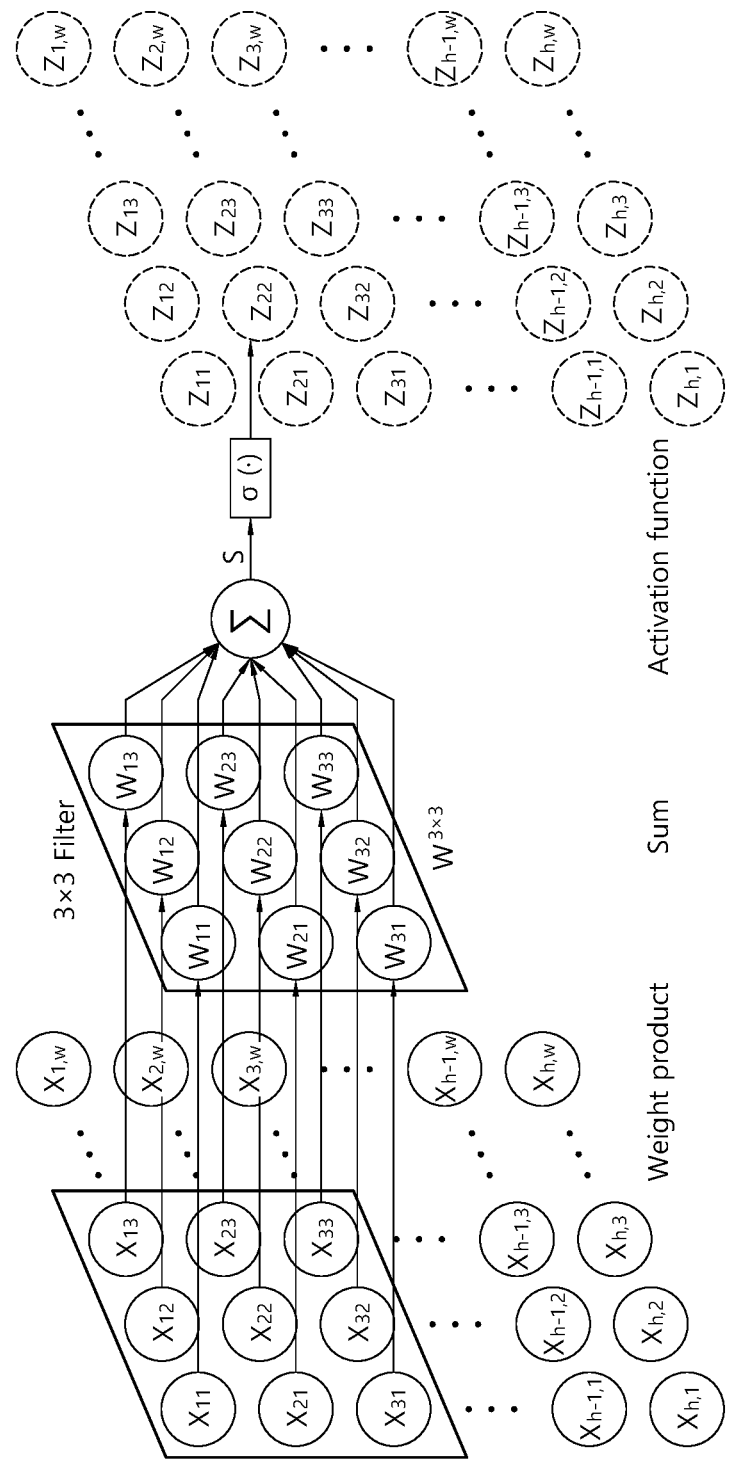
FIG. 8 illustrates a filter operation in a convolutional neural network.

FIG. 8 illustrates a filter operation in a convolutional neural network.

The convolutional neural network in FIG. 7 suffers from the problem that the number of weights grows exponentially with the number of connections, so instead of considering the connections of all modes between neighboring layers, we assume the existence of small filters and perform weighted sum and activation function operations on the overlapping parts of the filters, as shown in FIG. 8.

A filter can have as many weights as its size, and the weights can be trained to extract certain features of the image as factors and output them. In FIG. 8, a filter of size 3×3 is applied to the upper leftmost 3×3 region of the input layer, and the output of the weighted sum and activation function operations on that node is stored in $Z_{22}$.

The filter scans the input layer while moving a certain distance horizontally and vertically, performs weighted sum and activation function operations, and places the output value at the current filter position. This operation is similar to the convolutional operation on images in the field of computer vision, so a deep neural network with this structure is called a convolutional neural network (CNN), and the hidden layer generated by the convolutional operation is called a convolutional layer. In addition, neural networks with multiple convolutional layers are called deep convolutional neural networks (DCNNs).

In the convolutional layer, the number of weights can be reduced by calculating a weighted sum that includes only those nodes located in the region covered by the filter, at the node where the filter is currently located. As a result, a single filter can be utilized to focus on features for a local region. Therefore, CNNs can be effectively applied to image data processing where physical distance in a two-dimensional region is an important judgment criterion. On the other hand, CNNs can also be applied with multiple filters immediately before the convolutional layer, and multiple output results can be generated by the convolutional operation of each filter.

On the other hand, depending on the data properties, there may be data whose sequence characteristics are important. Considering the length variability and preceding and following relationships of such sequential data, the method of inputting the elements in the data sequence one by one at each timestep, and inputting the output vector of the hidden layer at a certain time (hidden vector) together with the next element in the sequence is called a recurrent neural network structure.

Figure 9:
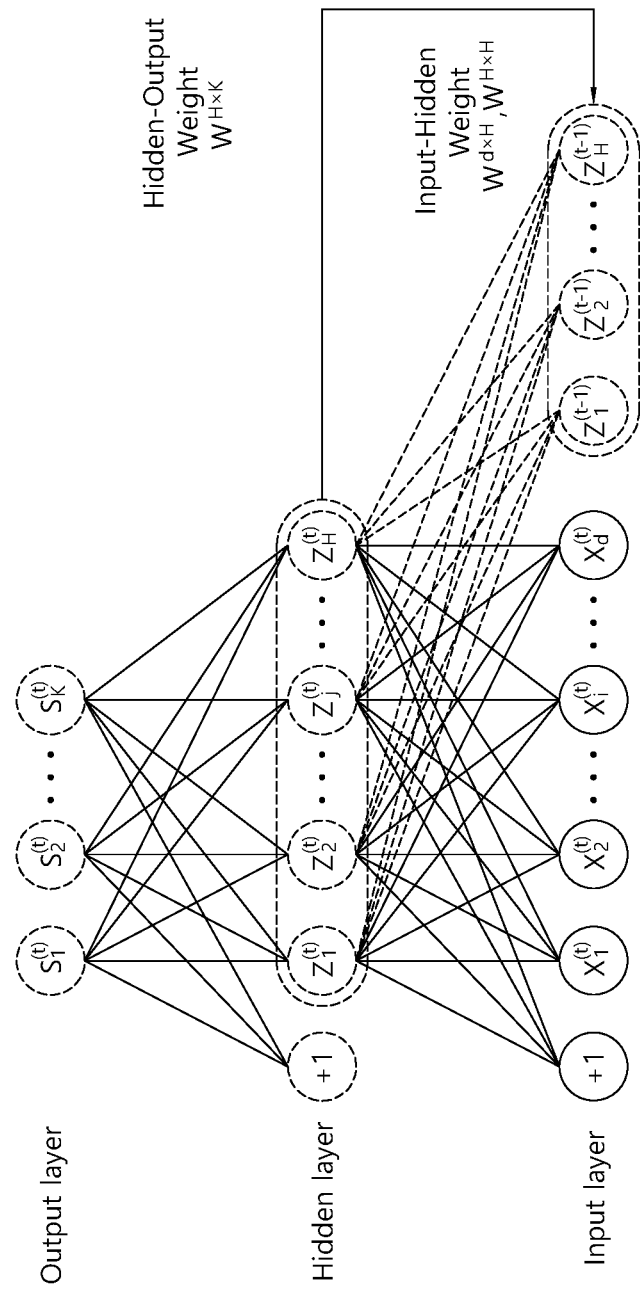
FIG. 9 illustrates a neural network structure with recurrent loops.

FIG. 9 illustrates a neural network structure with recurrent loops.

Referring to FIG. 9, a recurrent neural network (RNN) is a structure in which the elements $(x1(t), x2(t), \ldots, xd(t))$ at some point t in the data sequence are input to a fully connected neural network, and the hidden vectors $(z1(t-1), z2(t-1), \ldots, zH(t-1))$ at the immediately preceding point $t-1$ are input together to apply the weighted sum and activation function. The reason for passing the hidden vector to the next point in time is that the information in the input vector from previous points in time is considered to be accumulated in the hidden vector at the current point in time.

Figure 10:
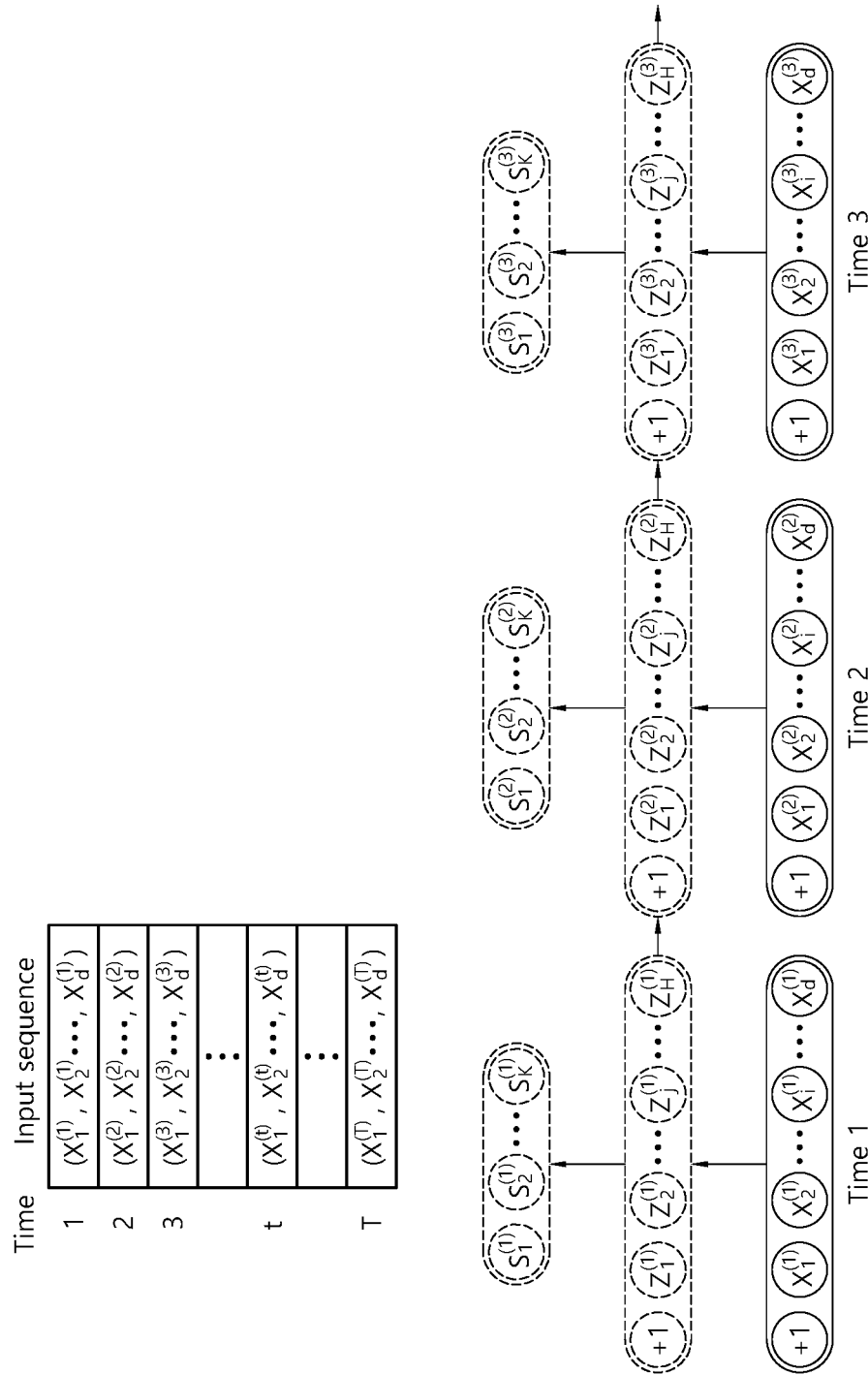
FIG. 10 illustrates the behavioral structure of a recurrent neural network.

FIG. 10 illustrates the behavioral structure of a recurrent neural network.

Referring to FIG. 10, a recurrent neural network operates on an input data sequence in a predetermined point-in-time order.

The hidden vectors $(z1(1), z2(1), \ldots, zH(1))$ when the input vectors $(x1(t), x2(t), \ldots, xd(t))$ at time 1 are fed into the recurrent neural network along with the input vectors $(x1(2), x2(2), \ldots, xd(2))$ at time 2 to determine the vectors $(z1(2), z2(2), \ldots, zH(2))$ in the hidden layer through weighted sum and activation function. This is repeated for time 2, time 3, . . . , time T, and so on.

On the other hand, when multiple hidden layers are placed within a recurrent neural network, it is called a deep recurrent neural network (DRNN). Recurrent neural networks are designed to be useful for sequential data (e.g., natural language processing).

As a neural network core used as a learning method, it includes DNN, CNN, RNN, and various deep learning techniques such as Restricted Boltzmann Machine (RBM), deep belief networks (DBN), and Deep Q-Network, and can be applied to fields such as computer vision, speech recognition, natural language processing, and speech/signal processing.

Recently, there have been attempts to integrate AI with wireless communication systems, but these have been focused on the application layer, the network layer, and especially the application of deep learning to wireless resource management and allocation. However, this research is increasingly moving to the MAC layer and the physical layer, and there are attempts to combine deep learning with wireless transmission, especially at the physical layer. AI-driven physical layer transport means that the underlying signal processing and communication mechanisms are based on AI drivers rather than traditional communication frameworks. For example, it can include deep learning-based channel coding and decoding, deep learning-based signal estimation and detection, deep learning-based MIMO mechanisms, AI-based resource scheduling and allocation, etc.

<THz (Terahertz) Communications>

Figure 11:
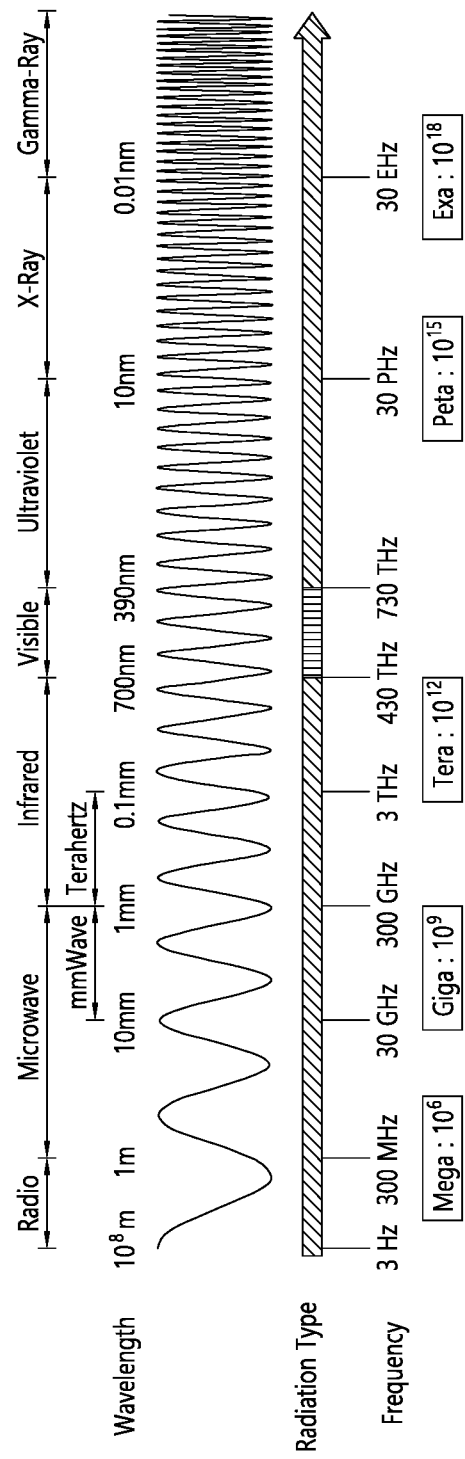
FIG. 11 illustrates an electromagnetic spectrum.

FIG. 11 illustrates the electromagnetic spectrum.

The data transfer rate can be increased by increasing the bandwidth. This can be accomplished by using sub-THz communications with wide bandwidth and applying advanced massive MIMO technology. THz waves, also known as submillimeter radiation, typically represent a frequency band between 0.1 THz and 10 THz with a corresponding wavelength in the range 0.03 mm~3 mm. The 100 GHz-300 GHz band range (Sub THz band) is considered the main part of the THz band for cellular communications. Adding the Sub-THz band to the mmWave band increases 6G cellular communication capacity. Among the defined THz bands, 300 GHz~3 THz is in the far infrared (IR) frequency band. The 300 GHz–3 THz band is part of the optical band, but it is on the border of the optical band, just behind the RF band. Therefore, this 300 GHz–3 THz band exhibits similarities to RF.

The key characteristics of THz communications include (i) widely available bandwidth to support very high data rates, and (ii) high path loss at high frequencies (highly directional antennas are indispensable). The narrow beamwidth produced by highly directive antennas reduces interference. The small wavelength of THz signals allows a much larger number of antenna elements to be integrated into devices and BSs operating in this band. This enables the use of advanced adaptive array techniques that can overcome range limitations.

<Optical Wireless Technology>

OWC technology is planned for 6G communications in addition to RF-based communications for all possible device-to-access networks. These networks will be connected to network-to-backhaul/fronthaul network connections. OWC technology has already been in use since 4G communication systems, but will be more widely used to meet the needs of 6G communication systems. OWC technologies such as light fidelity, visible light communication, optical camera communication, and FSO communication based on optical bands are already well known. Communication based on optical wireless technology can provide very high data rates, low latency, and secure communication. LiDAR can also be utilized for ultra-high resolution 3D mapping in 6G communications based on the optical band.

<FSO (Free Space Optics) Backhaul Network>

The transmitter and receiver characteristics of FSO systems are similar to those of fiber optic networks. Therefore, data transmission in FSO systems is similar to that of fiber optic systems. Therefore, FSO can be a good technology to provide backhaul connectivity in 6G systems in conjunction with fiber optic networks. With FSO, very long-distance communication is possible, even over distances of 10,000 kilometers or more. FSO supports high-capacity backhaul connectivity for remote and non-remote areas such as ocean, space, underwater, and isolated islands. FSO also supports cellular BS connectivity.

<Massive MIMO Technology>

One of the key technologies to improve spectrum efficiency is the application of MIMO technology. As MIMO technology improves, so does spectral efficiency. Therefore, large-scale MIMO technology will be important in 6G systems. Since MIMO technology uses multiple paths, it is important to consider multiplexing technology so that data signals can be transmitted on more than one path, as well as beam generation and operation technology suitable for the THz band.

<Blockchain>

Blockchain will be an important technology for managing large amounts of data in future communication systems. Blockchain is a form of distributed ledger technology, which is a database that is distributed across many nodes or computing devices. Each node replicates and stores a copy of the same ledger. Blockchains are managed as peer-to-peer networks. It can exist without being managed by a centralized authority or server. Data on a blockchain is collected together and organized into blocks. Blocks are linked together and protected using cryptography. Blockchain is inherently a perfect complement to IoT at scale with improved interoperability, security, privacy, reliability, and scalability. Thus, blockchain technology offers several features such as interoperability between devices, traceability of large amounts of data, autonomous interaction of different IoT systems, and large-scale connectivity reliability of 6G communication systems.

<3D Networking>

The 6G system will integrate terrestrial and aerial networks to support vertically expanding user communications. 3D BS will be provided via low-orbit satellites and UAVs. Adding a new dimension in terms of altitude and associated degrees of freedom makes 3D connectivity quite different from traditional 2D networks.

<Quantum Communication>

In the context of 6G networks, unsupervised reinforcement learning of networks is promising. Supervised learning methods are unable to label the vast amount of data generated by 6G. Unsupervised learning does not require labeling; therefore, this technique can be used to autonomously build representations of complex networks. By combining reinforcement learning and unsupervised learning, networks can be operated in a truly autonomous manner.

<Unmanned Aerial Vehicle>

Unmanned aerial vehicles (UAVs), or drones, will be an important element of 6G wireless communications. In most cases, high-speed data wireless connectivity will be provided using UAV technology. BS entities are installed on UAVs to provide cellular connectivity. UAVs have certain features not found in fixed BS infrastructure, such as easy deployment, strong line-of-sight links, and controlled degrees of freedom in mobility. During emergencies, such as natural disasters, deployment of ground communications infrastructure is not economically feasible and sometimes cannot provide service in volatile environments. UAVs can easily handle these situations. UAVs will be a new paradigm in wireless communications. This technology facilitates the three basic requirements of wireless networks, which are eMBB, URLLC, and mMTC. UAVs can also support a number of other purposes, such as enhancing network connectivity, fire detection, disaster emergency services, security and surveillance, pollution monitoring, parking monitoring, accident monitoring, and more. As such, UAV technology is recognized as one of the most important technologies for 6G communications.

<Cell-Free Communication>

Tight integration of multiple frequencies and heterogeneous communication technologies is critical in 6G systems. As a result, users will be able to move seamlessly from one network to another without having to create any manual configurations on their devices. The best network is automatically selected from the available communication technologies. This will break the limitation of the cell concept in wireless communication. Currently, the movement of users from one cell to another causes too many handovers in dense networks, resulting in handover failures, handover delays, data loss, and ping-pong effects. 6G cell-free communication will overcome all of these and provide better QoS. Cell-free communications will be achieved through multi-connectivity and multi-tier hybrid technologies and different heterogeneous radios in devices.

<Integration of Wireless Information and Energy Transmission>

WIET uses the same fields and waves as wireless communication systems. In particular, sensors and smartphones will be charged using wireless power transfer during communication. WIET is a promising technology for extending the lifetime of battery-powered wireless systems, so battery-less devices will be supported in 6G communications.

<Integrating Sensing and Communications>

An autonomous wireless network is the ability to continuously sense dynamically changing environmental conditions and exchange information between different nodes. In 6G, sensing will be tightly integrated with communications to support autonomous systems.

<Integration of Access Backhaul Network>

In 6G, the density of access networks will be enormous. Each access network will be connected by optical fiber and backhaul connections such as FSO networks. To cope with the very large number of access networks, there will be tight integration between the access and backhaul networks.

<Holographic Beamforming>

Beamforming is a signal processing procedure that adjusts an array of antennas to transmit a radio signal in a specific direction. It is a subset of smart antennas or advanced antenna systems. Beamforming technology has several advantages, such as high signal-to-noise ratio, interference avoidance and rejection, and high network efficiency. Holographic beamforming (HBF) is a new beamforming method that is quite different from MIMO systems because it uses software-defined antennas. HBF will be a very effective approach for efficient and flexible transmission and reception of signals in multi-antenna communication devices in 6G.

<Big Data Analysis>

Big data analysis is a complex process for analyzing various large data sets or big data. This process finds information such as hidden data, unknown correlations, and customer preferences to ensure complete data management. Big data is collected from various sources such as videos, social networks, images, and sensors. This technique is widely used in 6G systems to process massive amounts of data.

<Large Intelligent Surface (LIS)>

In the case of THz band signals, the straightness of the signal can cause many shadowed areas due to obstacles, and it is important to install LIS near these shadowed areas to expand the communication area, enhance communication stability, and provide additional value-added services. LIS is an artificial surface made of electromagnetic materials that can alter the propagation of incoming and outgoing radio waves. LIS can be seen as an extension of massive MIMO, but it has a different array structure and different mechanism of operation than massive MIMO. LISs also have the advantage of low power consumption because they operate as reconfigurable reflectors with passive elements, i.e., they only passively reflect signals without using active RF chains. In addition, each of the passive reflectors in the LIS should independently adjust the phase shift of the incident signal, which can be advantageous for wireless communication channels. By properly adjusting the phase shift through the LIS controller, the reflected signals can be gathered at the target receiver to boost the received signal power.

The following symbols/acronyms/terms are used herein as follows

FIIoT: Future Industrial IoT, IoT: Internet of Things, mMTC: Massive Machine Type Communications, PAA: Phased Antenna Array, THz; Terahertz, TRP: Tx Rx Point, TTD: True Time Delay.

As communication technology has evolved, there has been a growing need for a hyper-connected network environment where not only the devices people carry, but all devices and devices in their lives are connected to the network to create and share information. In order to realize such a hyper-connected society, technology development for mMTC, which aims to connect 1 million home and industrial IoT devices within a 1 km2 area, has been in full swing in 5G, and as we look toward the 6G era, not only more devices are required to be connected, but also low-latency communication. On another axis, ultra-high speed data transmission is also constantly required. To meet these requirements, a lot of effort is being put into the development of broadband communication technologies such as mmWave and THz.

Broadband requires the use of higher frequency bands such as mmWave and THz, where the higher the frequency, the greater the path loss of the signal. To overcome this, techniques such as beamforming the signal using array antennas are being applied. When beamforming is used, the transmit and receive beams should be matched between communication destinations (e.g., base station and UE or UE and UE). This process is called beam alignment. Beam alignment can be divided into initial beam acquisition during the initial setup or connection setup between communication targets and beam alignment through continuous beam tracking. If a phased antenna array (PAA) is used to apply the beamforming technique, the beam is formed in one direction at one point in time, so it is not suitable for communication services that require low latency because of the beam sweeping behavior during the beam alignment process and the need to apply the beam in a TDMA manner to communicate with UEs located in different directions for communication with multiple UEs.

On the other hand, the frequency-dependent multi-beam technique based on True-Time Delay (TTD) has the advantage of being able to form frequency-dependent multi-beams at a single point in time, which can speed up the initial beam acquisition and beam tracking, but it requires a solution to the problem of how and how much frequency resources should be allocated for actual data communication.

To apply frequency-dependent multi-beam techniques to applications requiring massive user connectivity and low delay, such as FIIoT, this disclosure proposes 1) a method for configuring reference multiple beams and multi-beam reference resources, 2) a method for configuring reference signals and common information to form multi-beams, and 3) a method for setting up multi-beam scheduling.

Figure 12:
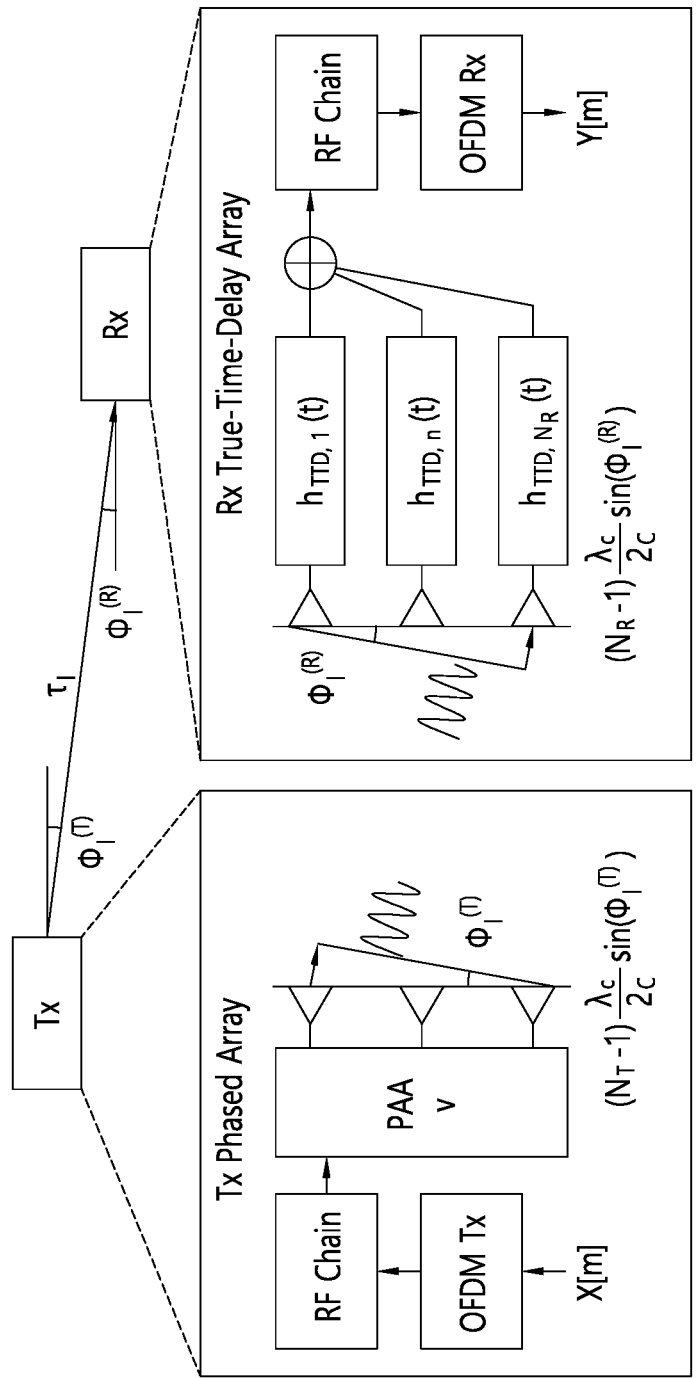
FIG. 12 is an example of modeling a transmitter, receiver, and channel according to the prior art.

FIG. 12 is an example of modeling a transceiver and channel according to the prior art.

In the system model shown in FIG. 12, the beamforming gain on the receiving side can be expressed as follows.

$$G(\theta, f_m) = \frac{1}{N_R} \left| \frac{\sin\left[\frac{N_R \pi}{2}(2f_m \Delta \tau + (f_m/f_c)\sin(\theta))\right]}{\sin\left[\frac{\pi}{2}(2f_m \Delta \tau + (f_m/f_c)\sin(\theta))\right]} \right|^2$$ [Equation 1]

Where, NR denotes the number of receive array antenna elements, ΔT denotes the value of delay tap spacing for the uniformly spaced delay tap $\tau_{TTD,n}$=(n−1) ΔT to be applied to each array antenna element, and $f_c$ and $f_m$ denote the frequencies corresponding to the center frequency and subcarrier index m (m=0, 1, . . . , M−1), respectively.

Figure 13:
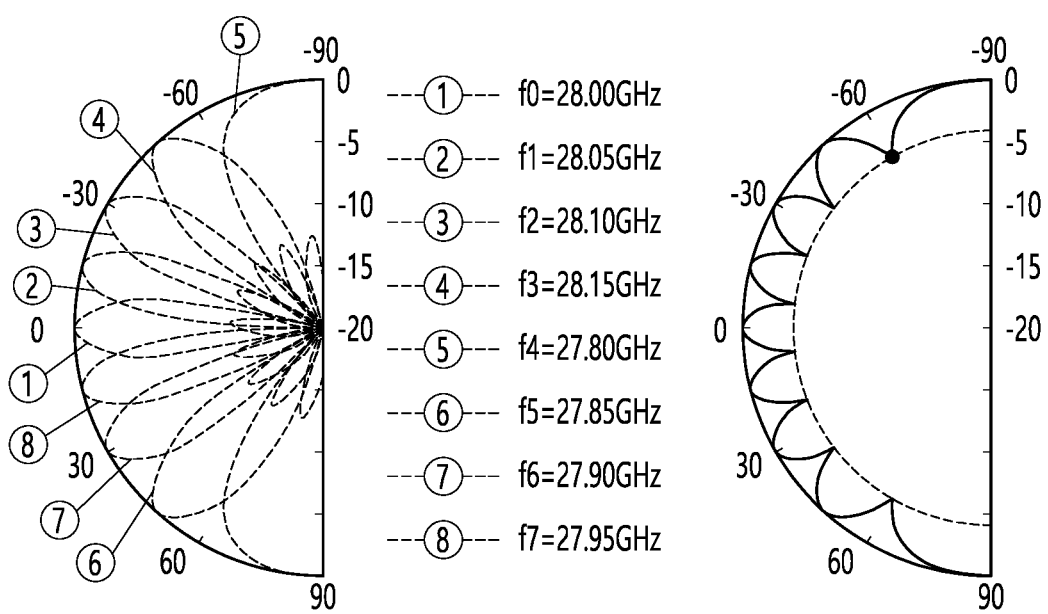
FIG. 13 is an example of true-time-delay (TTD) array based frequency dependent beam pattern, according to the prior art.

FIG. 13 is an example of a true-time-delay (TTD) array based frequency dependent beam pattern, according to the prior art.

FIG. 13 illustrates Eq. 1, specifically for the case of $f_c$=28 GHZ, bandwidth 400 MHZ, delay tap spacing ΔT=2.5 ns, $N_R$=8 receive antennas, and number of subcarriers M=8 within that bandwidth. This example shows that each subcarrier is forming a beam in a different direction.

Figure 14:
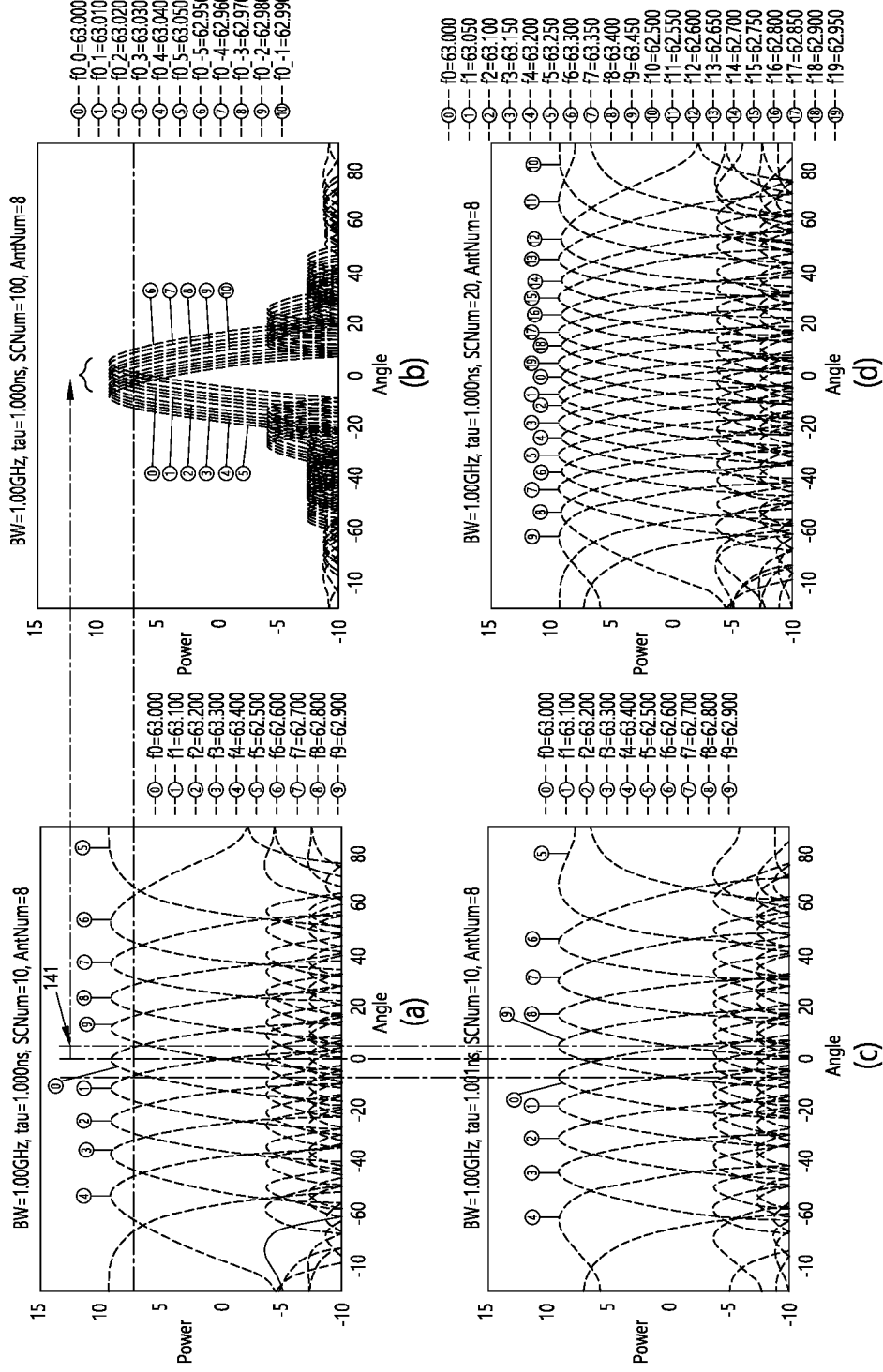
FIG. 14 illustrates reference multiple beams.

FIG. 14 illustrates reference multiple beams.

For single beam beamforming, a beam book can be organized so that neighboring beams can intersect in a 3 dB-beamwidth (also referred to as a 3 dB-beamband).

(a) of FIG. 14 illustrates an example of using frequency-dependent multiple beams to form such a beam pattern (i.e., a pattern in which adjacent beams intersect at a 3 dB-beamwidth) and the number of subcarriers and subcarriers required. (b) of FIG. 14 shows the corresponding power values for f0 (=63 GHz) as it is increased or decreased by 0.01 GHz.

In (a) of FIG. 14, suppose, for example, that a first beam of a first frequency (e.g., 63.000 GHz) has a maximum of power at a certain angle (e.g., 0 degrees) from the reference plane of the antenna. In this case, the first beam may have a power as low as 3 dB below the maximum of power at, for example, −6 degrees and +6 degrees from the reference plane of the antenna. In this case, the second beam at the second frequency (e.g., 62.900 GHZ) may have a power maximum at, for example, 13 degrees from the reference plane of the antenna, and a power lower than this power maximum by 3 dB at 6 degrees and 18 degrees. Further, the third beam at the third frequency (e.g., 63.100 GHZ) may have a power maximum at, for example, −13 degrees from the reference plane of the antenna, and may have powers as low as 3 dB from this power maximum at −6 degrees and −18 degrees. In this example, the first and second beams have equal power at 6 degrees from the reference plane of the antenna, and the first and third beams have equal power at −6 degrees from the reference plane of the antenna. For convenience in creating these beam patterns, neighboring beams are said to intersect at a 3 dB-beamwidth.

In the case of frequency-dependent multiple beams, it can be said that a beam is actually formed for each frequency (i.e., each subcarrier), as shown in (a) of FIG. 14 or (b) of FIG. 14, so even if the position of the UE does not change, the beam will be different depending on the frequency resource used, so the performance difference can be significant depending on which frequency resource is selected. In the case of frequency-dependent multiple beams, the beams are already determined for each frequency, so it is a matter of which frequency resources within a range are selected, and how the reference multiple beams are constructed to determine this.

Reference multiple beams may be, for example, beams formed by reference signals (e.g., SSB or CSI-RS of 3GPP NR, or a signal configured for reference multiple beams), and the reference signals may be generated to form beams that cover each angle. For example, beams formed at regular intervals to cover the entire area (−90° to +90°) can be called reference multiple beams. In this case, the signal transmitted at each specific frequency to form each beam can be called the reference signal. Here, the reference signal does not have to be a single tone (i.e., consisting of one RE), but can be a sequence of any length, and can utilize the SSB of the 3GPP NR.

The reference multiple beams can be used for fast initial beam acquisition during the connection setup phase. They can also be utilized for coarse beam tracking during the Discovery phase.

However, problems may arise if, during the connection setup phase, the frequency resource blocks available (or allocable) to the UE are determined solely by the selected beam from the reference multiple beams, such as in (a) of FIG. 14.

In fn_m in (b) of FIG. 14, fn corresponds to fn in (a) of FIG. 14, and m is an index to indicate the corresponding beam within the frequency from the center (peak) of fn in (a) of FIG. 14 to the 3 dB-beamwidth (denoted by (+) or unsigned on the left and (−) on the right relative to the center). For example, in (b) of FIG. 14, if the UE is at the position (angle) where f0_−5 (=62.950 GHZ) corresponds to the peak, the beam corresponding to the frequency of f0 (=63.000 GHZ) will be selected from the reference multiple beams in (a) of FIG. 14. Based on the f0 frequency, the range of frequency resources corresponding to the 3-dB beam width can be considered to be f0−f/2~f0+f/2. Here, f represents the frequency spacing between adjacent beams forming the reference multi-beam. For example, if f is a value significantly larger than 0.01 GHz (e.g., 0.1 GHZ), the UE will use or be allocated frequency resources within the range of 62.950 GHz to 63.050 GHz based on f0 (=63.000 GHz). Then, in (b) of FIG. 14, a frequency resource between f0_1 (=63.010 GHZ) and f0_5 (=63.050 GHZ) could be selected for a UE at an angle corresponding to the peak at f0_−5 (62.950 GHz), which is not appropriate in terms of power.

To prevent this problem, the reference multi-beam and multi-beam reference resource frequency resources can be configured as follows.

Method 1) Form reference multiple beams to intersect at 3 dB-beamwidth, but give an offset (e.g., ½ of the 3 dB-beamwidth) depending on the transmission time of the reference multiple beams (e.g., even-numbered slot or odd-numbered slot).

For example, N reference multiple beams can be transmitted once as shown in (a) of FIG. 14 and the next time as shown in (c) of FIG. 14. In this case, if there is a UE at a position (angle) corresponding to the peak of f0_−5 in the preceding example (with a UE in each direction corresponding to the vertical dotted line 141 in (a) of FIG. 14 and (c) of FIG. 14), the UE will obtain a peak value for f0 at the time of transmitting the reference multiple beam as shown in (a) of FIG. 14, and will obtain a peak value for a frequency signal corresponding to f9 at the time of transmitting the reference multiple beam as shown in (c) of FIG. 14. Based on the results of these measurements, the UE can select or be assigned a frequency resource block between f9 (62.900 GHz) and f0 (63.000 GHZ).

Method 2) In a configuration where the beams intersect at a conventional 3 dB-beamwidth, the reference multiple beams can be formed to further include a beam that peaks in power at each intersection, as shown in (d) of FIG. 14. In this case, the number of beams comprising the reference multiple beams is twice as many as in the previous case, and the frequency spacing between the beams is ½. In this case, the UE can choose or be allocated resources between the frequencies corresponding to the two best neighboring beams.

Figure 15:
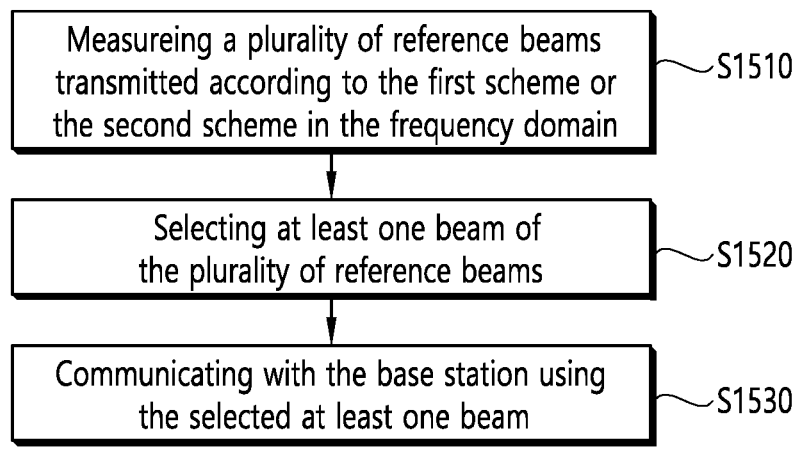
FIG. 15 illustrates an operation method of a UE in a wireless communication system.

FIG. 15 illustrates a method of operating a UE in a wireless communication system.

Referring to FIG. 15, the UE measures a plurality of reference beams transmitted according to the first scheme or the second scheme in the frequency domain (S1510).

For example, the UE may perform beam measurement based on the SSB (SS/PBCH block) included in each reference beam. Alternatively, the UE may perform beam measurement based on the CSI-RS included in each reference beam.

The first scheme may be the method 1 described above, i.e., transmitting N (N being a natural number of 2 or more) reference beams at the first transmission time, and transmitting the N reference beams with an offset at the second transmission time. At the first transmission time and the second transmission time, the frequency spacing of the two neighboring frequencies in the N reference beams is the same, which is referred to as the first frequency spacing ($\Delta f$).

The second scheme is a method of transmitting 2N reference beams at the first transmission time or the second transmission time as described above. The frequency spacing of the two adjacent frequencies of the 2N reference beams is called the second frequency spacing, and the second frequency spacing is ½$\Delta f$, i.e., half the frequency spacing of the two adjacent frequencies of the N reference beams in the first scheme.

In other words, as shown in (d) of FIG. 14, 2N beams are transmitted, consisting of N reference beams and another N beams covering the space between them. The N reference beams can be configured so that the beams intersect at a conventional 3 dB-beamwidth (as in (a) or (c) of FIG. 14), and another N reference beams peaking in power at each intersection can be added to form a total of 2N reference multiple beams.

The UE selects at least one beam of the plurality of reference beams (S1520). Although not shown in FIG. 15, the UE may further comprise the step of reporting the results of measuring the reference beams to the base station. It may further comprise receiving information from the base station indicating a beam based on the measured results, and selecting the one beam based on the information.

The UE communicates with the base station using the selected at least one beam (S1530).

Figure 16:
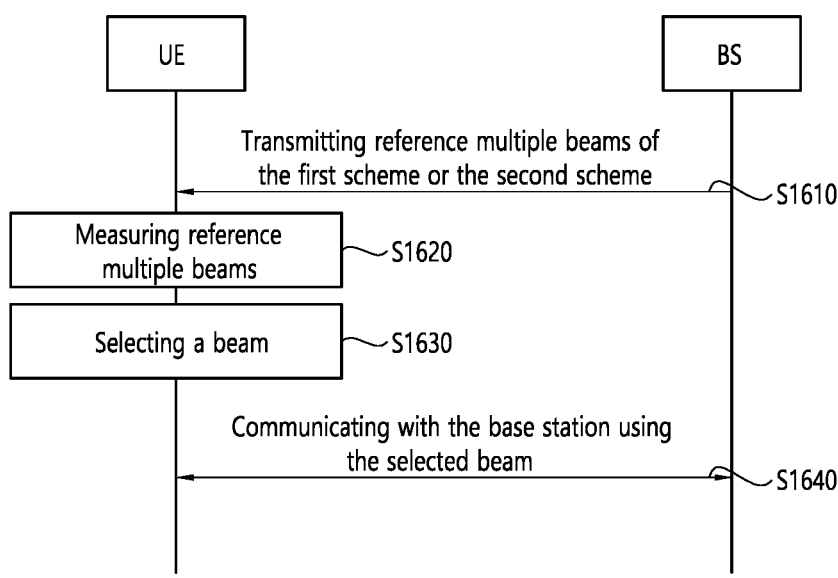
FIG. 16 illustrates an operation method between a base station and a UE.

FIG. 16 illustrates an operation method between a base station and a UE.

Referring to FIG. 16, the base station transmits reference multiple beams of the first scheme or the second scheme to the UE (S1610).

The UE measures reference multiple beams (S1620) and selects a beam (S1630). Between measuring the reference multiple beams (S1620) and selecting the beams (S1630), the process may further include reporting the results of the measurement of the reference beams by the UE to the base station and receiving information from the base station indicating the beams based on the results of the measurement.

The UE can communicate with the base station using the selected beam (S1640).

Figure 17:
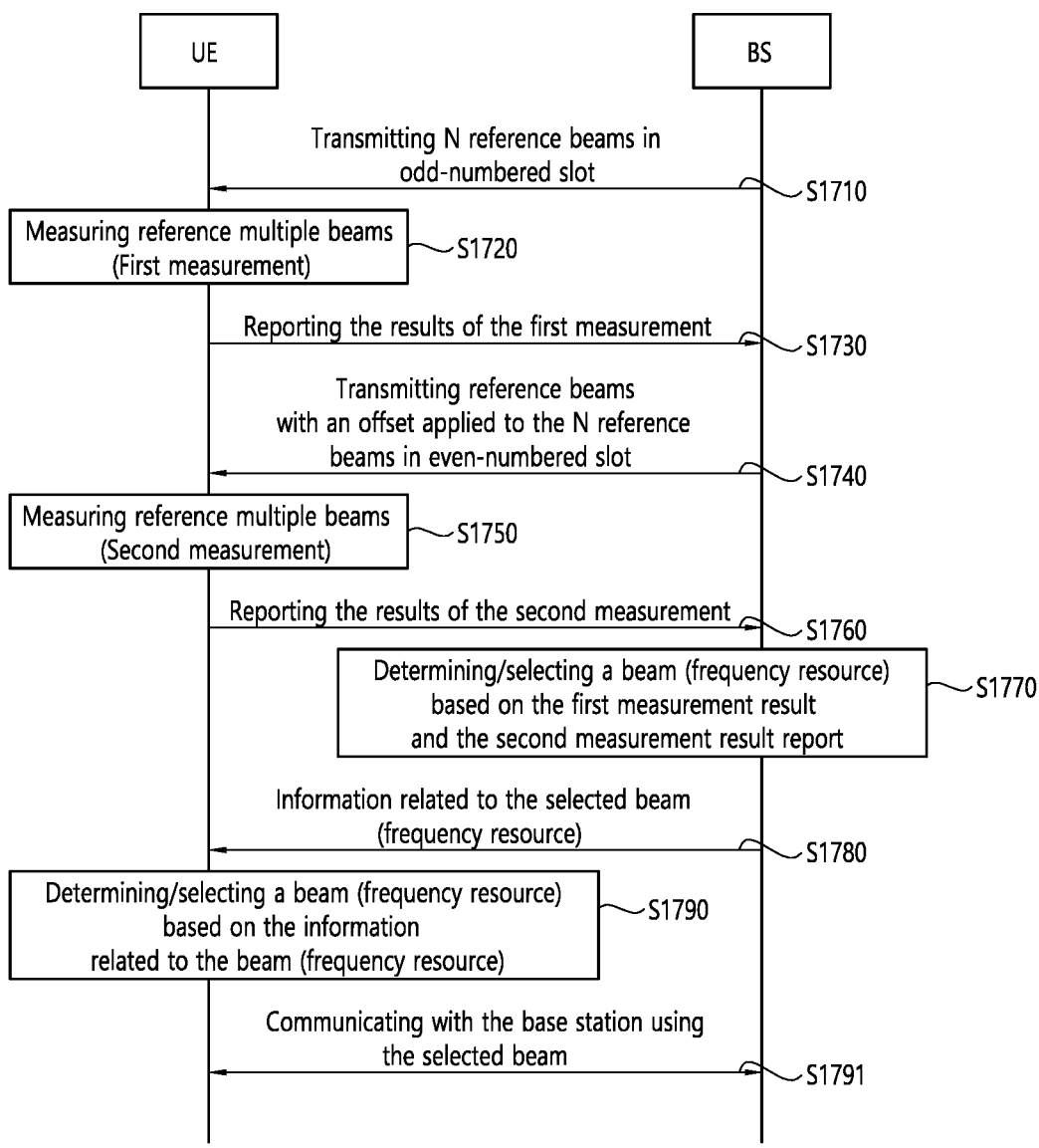
FIG. 17 illustrates a specific operation of a base station and a UE when applying method 1 (=first scheme).

FIG. 17 illustrates specific operations of the base station and the UE when method 1 (=first scheme) is applied.

Referring to FIG. 17, the base station transmits N (where N is a natural number) reference beams in odd-numbered slots (S1710). Among the N reference beams, two adjacent reference beams in the frequency domain may intersect at a 3 dB-beamwidth, as shown in (a) of FIG. 14.

The UE measures the N reference beams (S1720). Let this measurement be called the first measurement. Suppose that in the first measurement, the first beam of the first frequency is measured as the best beam. The UE reports the results of the first measurement, including this result (S1730).

The base station transmits N different reference beams with an offset to the N reference beams in even-numbered slots (S1740). The offset may be related to ½ of the 3 dB-beamwidth, i.e., N different reference beams may be transmitted as shown in (c) of FIG. 14. The UE measures these N different reference beams (S1750). Let this be referred to as the second measurement. Suppose that in the second measurement, the second beam at the second frequency is measured as the best beam. The UE reports the results of the second measurement, including these results (S1760).

Based on the first measurement result and the second measurement result report, the base station determines/selects a beam (frequency resource) (S1770) and informs the UE of information related to the beam (frequency resource) (S1780). For example, a beam (frequency resource) between a first frequency and a second frequency may be determined/selected.

The UE may determine/select a beam (frequency resource) based on information related to the beam (frequency resource) (S1790).

The UE and the base station perform communication using the selected beam (frequency resource) (S1791). FIG. 17 illustrates an example where the base station determines the beam (frequency resource) and informs the UE, but this is not a limitation, i.e., the UE may also determine the beam (frequency resource) based on the first measurement and the second measurement.

Figure 18:
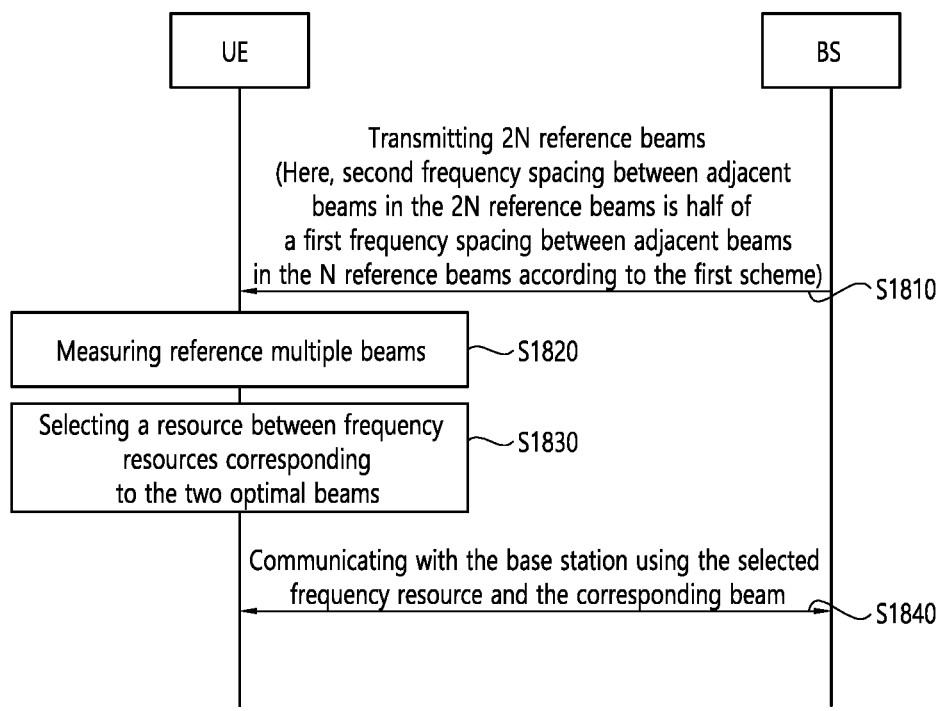
FIG. 18 illustrates the specific behavior of the base station and the UE when applying method 2 (=method 2).

FIG. 18 illustrates a specific behavior of a base station and a UE when applying Method 2 (=the second scheme).

Referring to FIG. 18, the base station transmits 2N reference beams (S1810). The 2N reference beams may include: i) the N reference beams of the first scheme above; and ii) N different reference beams having power peak values at the intersections of the N reference beams of the first scheme above. That is, it may be to transmit 2N reference beams with a reduced frequency spacing between the reference beams as shown in (d) of FIG. 14. For example, if the frequency spacing of the two adjacent frequencies in the N reference beams of the first scheme is $\Delta f$, the frequency spacing of the two adjacent frequencies in the 2N reference beams of the second scheme is ½$\Delta f$, i.e., the 2N reference beams comprise the N reference beams and another N beams covering the gap between them.

The UE measures the 2N reference beams (S1820).

The UE can select a resource between frequency resources corresponding to the two optimal beams with the best measurement results among the 2N reference beams (S1830).

The UE and the base station perform communication using the selected beam (frequency resource) (S1840).

Although not shown in FIG. 18, after step S1820, the method may further comprise the steps of the UE reporting the results of the reference multiple beams measurement to the base station, the base station determining/selecting a beam (frequency resource) based on the measurement results, and informing the UE of information related to the beam (frequency resource).

<Multiple Beam Configuration and Utilization Method>

Beam acquisition is performed through SSB (common to all UEs), and then CSI-RS (and/or reference signal for beam tracking) may be set and transmitted for beam tracking (UE-specific). Similarly, multiple beams transmitted in multiple directions at one point in time can be set up and transmitted differently depending on the purpose (beam acquisition or beam tracking), or a single multiple beams setup and transmission can be used for both beam acquisition and beam tracking.

At least multiple beams (reference multiple beams) for beam acquisition can be transmitted in the form of a reference signal and an assistant information channel as shown below.

The reference signal can be configured as a sequence capable of cell detection, such as a synchronization signal (PSS/SSS).

The assistant information channel provides information about cell, TRP, and multibeam settings to enable the UE to select and update the appropriate resources. The assistant information may include MIB information from existing 3GPP NR and may include the following information.

i) Reference multiple beams type (Type 1 or Type 2) and transmission period, ii) Center frequency and bandwidth, iii) Number of beams forming the multibeam and frequency spacing between beams, and iv) Diversity order.

Figure 19:
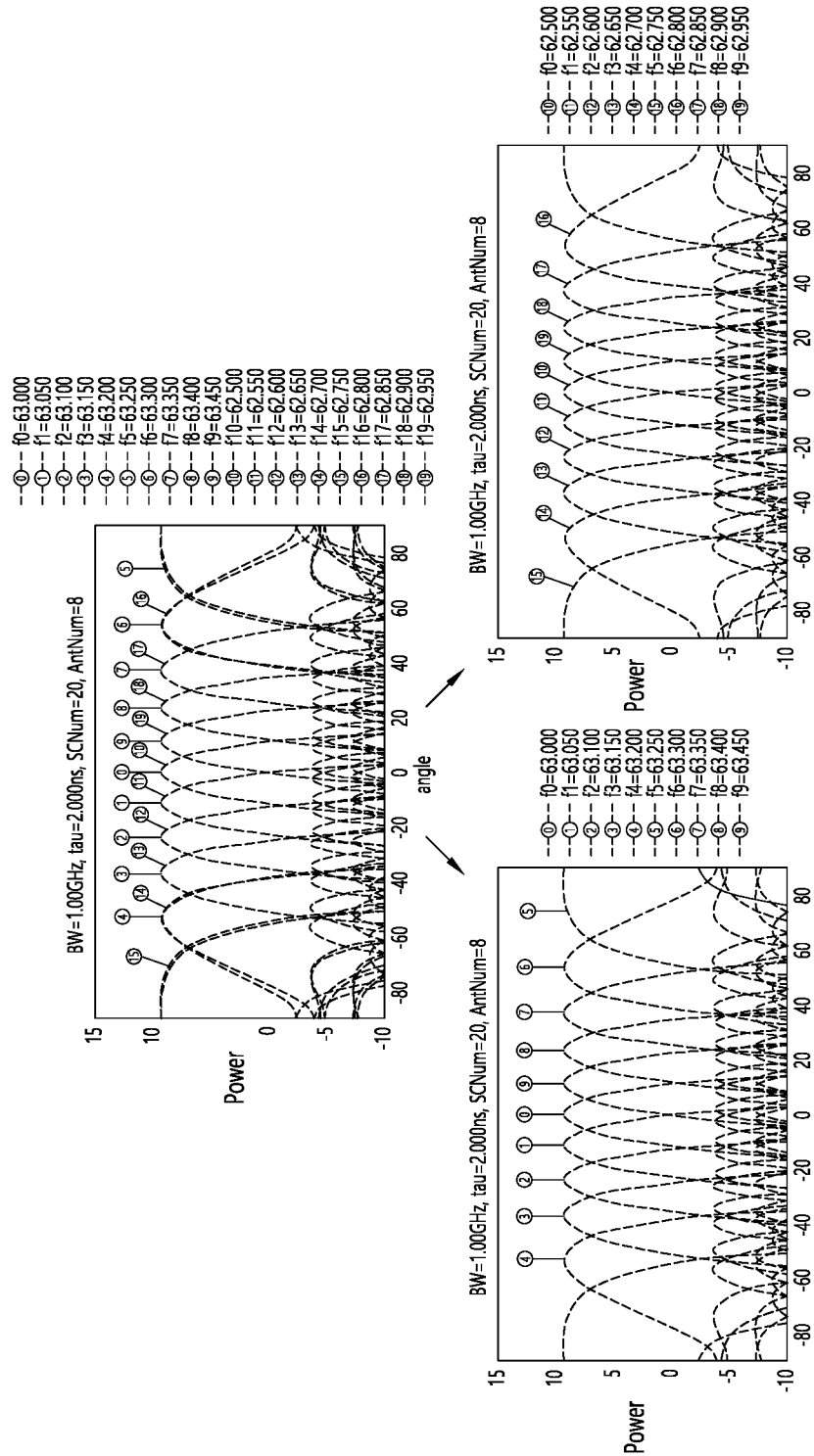
FIG. 19 illustrates a case where the diversity order is 2.

FIG. 19 shows an example with a diversity order of 2.

Referring to FIG. 19, a diversity technique can be applied to cope with a frequency selective multipath channel. The total bandwidth can be divided by the number of diversity orders (2 in FIG. 19), and the beam can be designed so that each frequency bin covers a full angle.

v) TRP ID (or Index)—If a cell is composed of multiple TRPs (Tx/Rx Points), it can contain that information.

vi) SIB1 scheduling information (time-offset w/SSB)—After cell/TRP/beam detection, information for signaling, such as RACH for connection establishment, may be transmitted in SIB1 as in 3GPP NR. For SIB1 transmission and RACH reception, the base station uses multiple beams.

The base station may also use multibeam transmission for UE beam tracking after UE connection. In this case, the auxiliary information mentioned above can be transmitted in RRC messages, so a separate physical channel type is not necessarily required. Multiple beams for beam tracking may be transmitted UE-specifically, or may be commonly transmitted to all UEs.

In a UE-specific case, a reference signal is assigned to form multiple beams for a resource area determined through a reference multiple beams, a resource area corresponding to the direction of the beam determined through beam tracking, or a nearby surrounding area including it. In this case, rather than forming multiple beams in all directions (angles), multiple beams are formed only in the currently aligned beam direction and its surroundings, allowing for more precise beam alignment.

If multiple beams for beam tracking are common to all UEs, a reference signal can be allocated for the entire system bandwidth.

In both of the above cases, more beams are formed, compared to the case for beam acquisition, to increase the Angle of Departure (AOD)/Angle of Arrival (AOA) resolution, allowing the UE to select better resources. Therefore, a plurality of multiple beams configurations are possible, and each configuration may have different frequency coverage (number of RBs), number of beams, frequency spacing between beams, transmission period, etc.

The UE can determine the appropriate frequency resource (multiple beams reference resource) for itself through reference multiple beams detection and also notify the base station, so that the base station can allocate the appropriate resource to the UE when the base station uses multiple beams for data communication.

<Multiple Beam Scheduling Settings>

In communication systems that require massive connectivity, such as the Internet of Things (IoT), most of the time, small amounts of data are sent and received periodically, making the use of frequency-dependent multiple beams appropriate, but in some cases, large amounts of data need to be sent and received, and a scheduling method is required.

Figure 20:
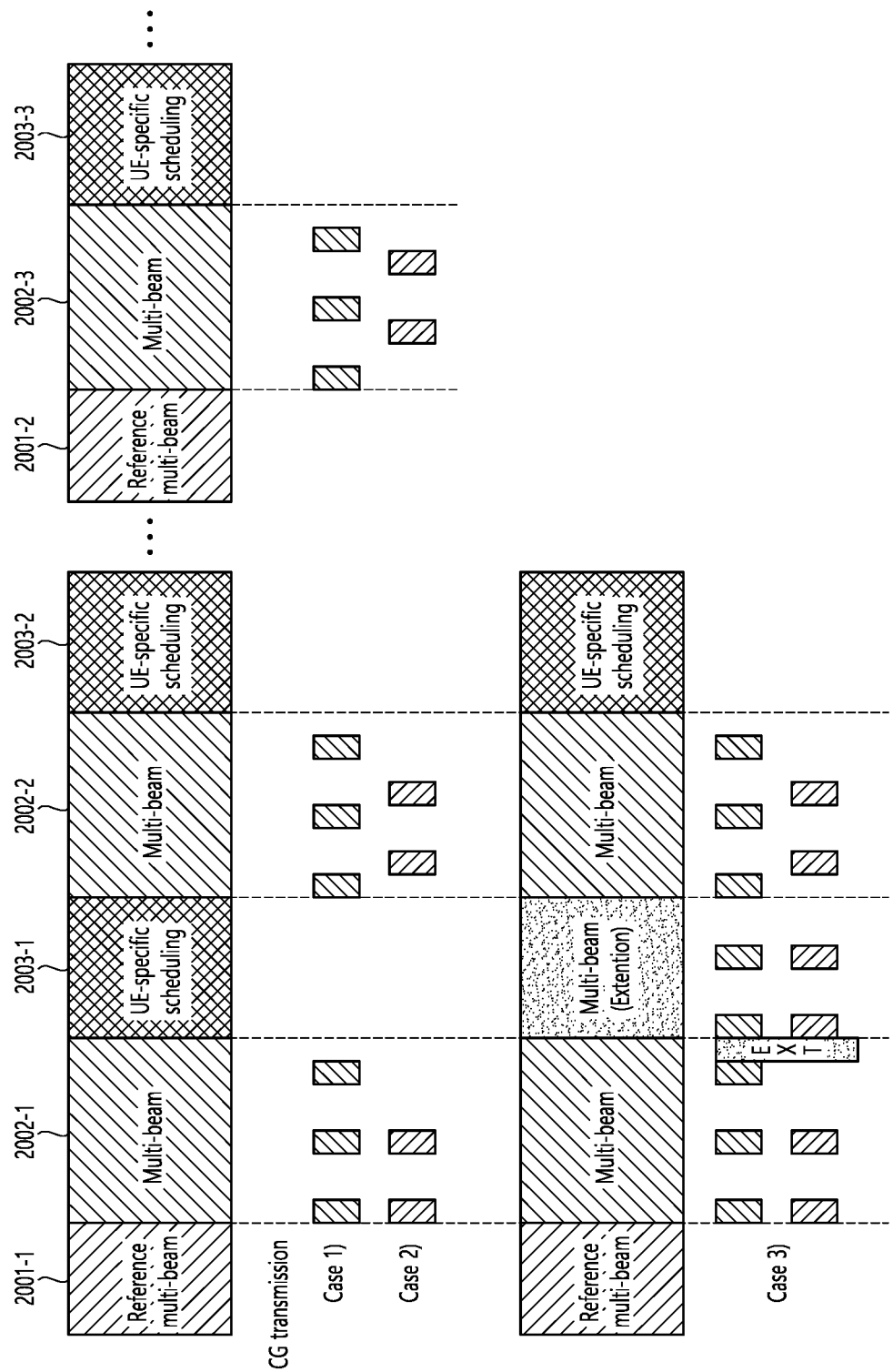
FIG. 20 is an example of a scheduling setting.

FIG. 20 shows an example of a scheduling setup.

Referring to FIG. 20, the reference multiple beams transmission duration (2001-1, 2001-2, which may also be referred to as reference multi-beam duration) is primarily for initial acquisition (including the RRC connection process), but for already connected UEs, the signals from the reference multiple beams transmission duration may also be utilized for beam tracking and frequency resource renewal. The length and period of the reference multiple beams transmission duration can be fixed so that all UEs know in advance.

The multibeam duration (e.g., 2002-1, 2002-2, or 2002-3, which may also be referred to as the multi-beam duration), located after the reference multiple beams transmission duration, is a duration in which the base station simultaneously transmits and receives data from UEs in multiple directions, and may establish either a downlink Configured Grant transmission or an uplink Configured Grant transmission. It can be set the same for every multibeam duration (Case 1), or can be set differently for each multibeam duration (Case 2).

By notifying whether or not to extend the multibeam duration at the end of each multibeam duration, the multibeam duration can be extended as needed (Case 3).

In UE-specific duration (e.g., 2003-1, 2003-2, or 2003-3, which may also be referred to as UE-specific scheduling duration), frequency resources corresponding to the entire bandwidth can be allocated to one UE in a single beam, or multiple beams can be formed within a specific frequency region (i.e., within a specific range/direction) for specific purposes such as beam tracking and finer beam refinement.

The length and frequency of multibeam duration and UE-specific duration are configurable.

Figure 21:
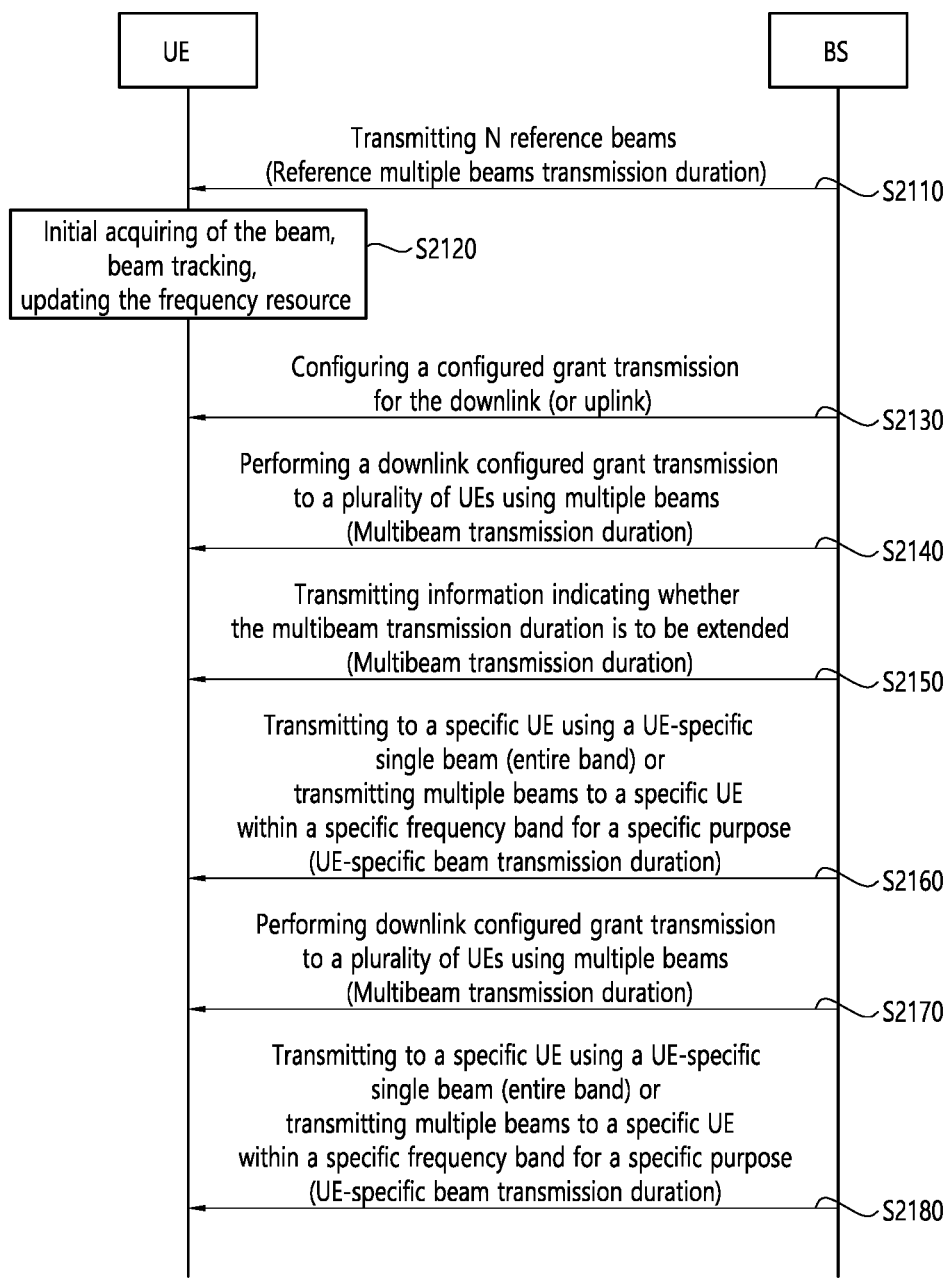
FIG. 21 illustrates an operation between a base station and a UE according to the method of FIG. 20.

FIG. 21 illustrates operation between a base station and a UE according to the method of FIG. 20.

Referring to FIG. 21, the base station transmits N (where N is a natural number) reference beams in a reference multiple beams transmission duration to the UE (S2110).

The UE may utilize the N reference beams for at least one of the operations of initially acquiring the beams, tracking the beams, and updating the frequency resource (S2120).

The base station configures a configured grant transmission for the downlink (or uplink) (S2130) and performs a downlink configured grant transmission to a plurality of UEs using multiple beams in a multibeam transmission duration (=multibeam duration) (S2140). The multibeam transmission duration (=multibeam duration) may be a duration in which a plurality of UEs and base stations are set to perform communication via a plurality of beams. If a plurality of multibeam durations are configured, each multibeam duration may be set to perform either the downlink set grant transmission or the uplink set grant transmission using the same resources.

The base station may transmit information (referred to as extension information) indicating whether the multibeam transmission duration is to be extended in the multibeam transmission duration (S2150). If the extension information indicates a specific value, the UE-specific scheduling duration following the multibeam duration may be considered and operated as the multibeam duration.

In a UE-specific beam transmission duration (=UE-specific scheduling duration), transmission can be made to a specific UE using a UE-specific single beam (entire band). That is, a UE-specific scheduling duration may be located next to the multibeam duration, and the UE-specific scheduling duration may be a time duration in which the entire available band can be allocated to a specific UE. Alternatively, in a UE-specific beam transmission duration (=UE-specific scheduling duration), multiple beams may be transmitted to a specific UE within a specific frequency band for a specific purpose (beam tracking or beam refinement) (S2160).

The multibeam duration and the UE-specific scheduling duration located after it can be set by the base station.

Afterwards, the base station performs downlink configured grant transmission to a plurality of UEs using multiple beams in a multibeam transmission duration (S2170).

Then, again in a UE-specific beam transmission duration (UE-specific scheduling duration), a UE-specific single beam (full band) may be transmitted to a specific UE, or multiple beams may be transmitted to a specific UE within a specific frequency band for a specific purpose (beam tracking or beam refinement) (S2180).

Advantageous Effects of the Present Disclosure

As the frequency increases, such as mmWave or THz, the signal path loss increases. To overcome this, beamforming techniques are used. To achieve higher beamforming gain, more array antennas are used, resulting in a sharper beam. As the beamwidth narrows, more beams are needed to cover the entire area, so the traditional method of forming one beam at a time requires a lot of time for initial beam acquisition/refinement/tracking.

To solve this, a frequency-dependent multiple beams, technique can be used, which allows beams to be formed in all directions (of the area) at a single instant, allowing the UE to perform fast beam acquisition. Although the UE can quickly acquire a coarse beam using reference multi-beams, when transmitting a response, if the frequency resource used by the detected reference beam is used as is, performance problems may occur due to coarse beam alignment. In particular, as the frequency increases, such as THz, the beamwidth becomes narrower, so this problem can become a serious problem.

In the present disclosure, i) transmit N reference beams at each of successive transmission time points (e.g., two successive transmission time points), but with different appropriate offsets, and measure/select one optimal beam for each of the N reference beams. After detecting/selecting two optimal beams for the two transmissions, the final beam/frequency resource can be selected based on these two optimal beams. ii) Transmit 2N reference multiple beams instead of N reference multiple beams, but reduce the frequency spacing of the reference beams by ½, select the best 2 beams from these 2N reference multiple beams, and select beam/frequency resources based on these 2 best beams. By using this method, the optimal beam (frequency resource) can be found efficiently, and the UE can determine the transmission frequency resource on its own before establishing a connection. Additionally, by receiving the response signal from the UE, the base station can know the direction of the UE and perform beam refinement efficiently.

The same multi-beam technique can be utilized during beam refinement for faster beam refinement or beam tracking.

Additionally, multi-beam techniques are very efficient for connecting large numbers of users. This is because during the multibeam transmission/reception duration, the base station can transmit and receive signals in all directions simultaneously. Configured grant transmission and reception for frequency resources or frequency resource pools according to location can be applied to UEs in each direction to increase the efficiency of large-scale user connections. In some cases, many frequency resources should be allocated for high-speed data transmission, so single-beam techniques should also be used. In this disclosure, taking this into consideration, from a scheduling perspective, a reference multibeam duration, a multibeam duration, and a UE-specific duration are provided. A multibeam duration can also be extended through a dynamic grant (extension information) in the last part of the set duration (single slot or multiple slots). According to this method, resources can be efficiently allocated and scheduled according to the environment and situation.

Although not limited thereto, the various proposals of the present disclosure described above can be applied to a variety of fields requiring wireless communication/connectivity (e.g., 5G) between devices.

Figure 22:
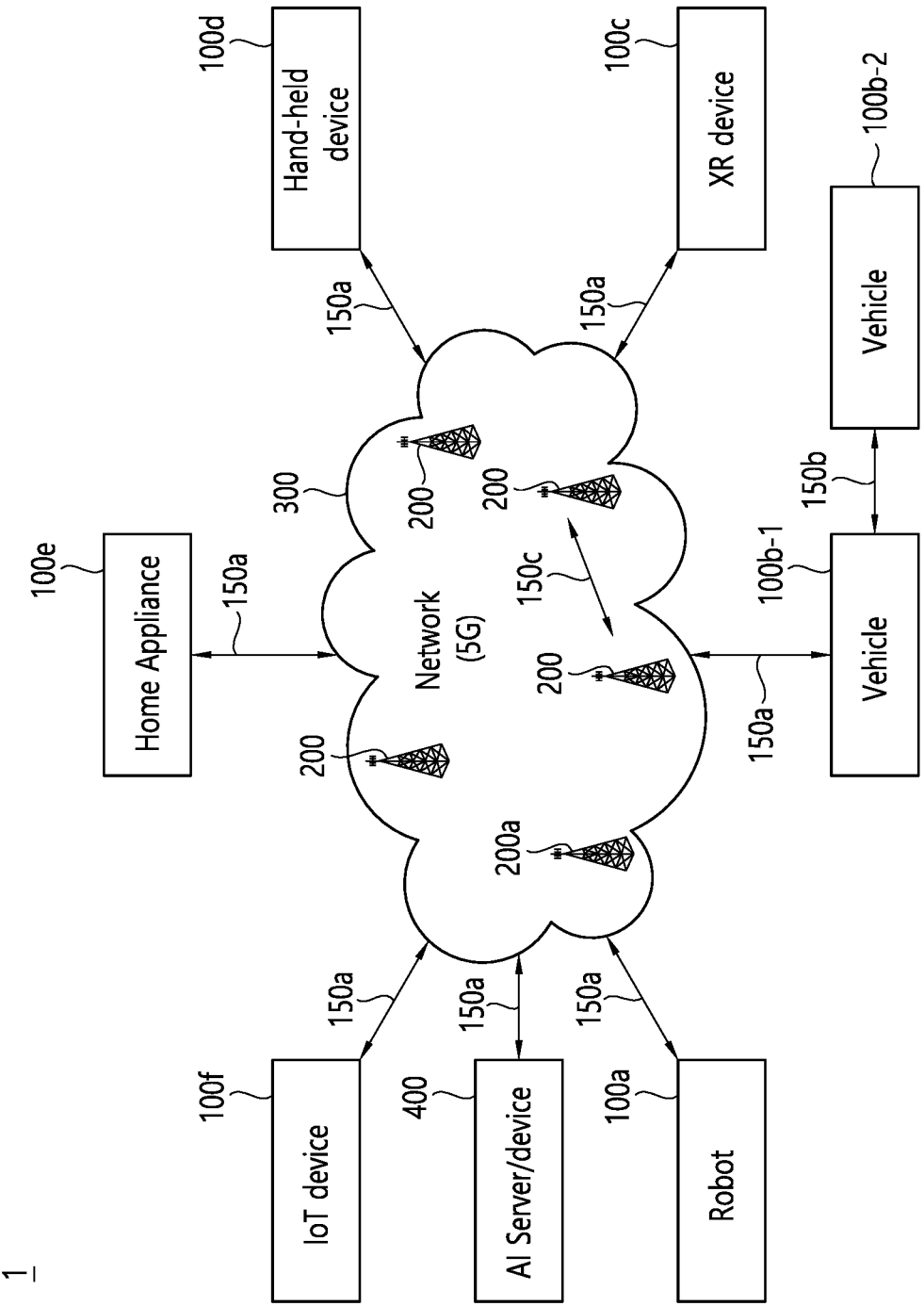
FIG. 22 illustrates a communication system 1 applicable to the present disclosure.

FIG. 22 illustrates a communication system 1 applied to the present disclosure.

Referring to FIG. 22, the communication system 1 applied to the present disclosure includes a wireless device, a base station, and a network. Here, the wireless device refers to a device that performs communication using a wireless access technology (e.g., 5G NR (New RAT), LTE (Long Term Evolution)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e.), an Internet of Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and it may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and a specific wireless device 200a may operate as a base station/network node to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b may be established between the wireless devices 100a~100f/BS 200-BS 200/wireless device 100a~100f. Herein, the wireless communication/connections may be established through various RATs (e.g., 5G NR) such as uplink/downlink communication 150a, sidelink communication 150b (or, D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels based on all/part of the process of FIG. 2. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
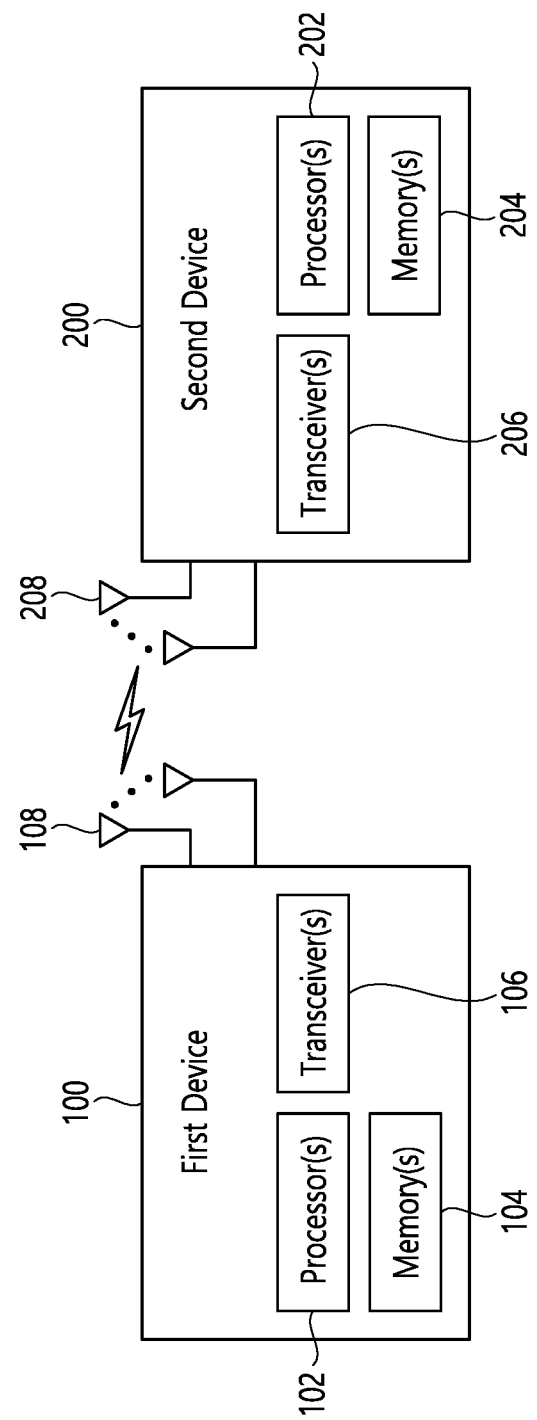
FIG. 23 illustrates a wireless device that may be applied to the present disclosure.

FIG. 23 illustrates a wireless device applicable to the present disclosure.

Referring to FIG. 23, the first wireless device 100 and the second wireless device 200 may transmit and receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 22.

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the described/suggested functions, procedures and/or methods in above. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory102 and may store a variety of information related to operations of the processor 102. For example, the memory 104 may store software code including commands for performing a part or the entirety of processes controlled by the processor 102 or for performing the described/suggested procedures and/or methods. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present disclosure, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the described/suggested functions, procedures and/or methods in above. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the described/suggested procedures and/or methods in above. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in this document may be implemented using firmware or software and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Where the first wireless device or the second wireless device is a base station, the base station may transmit a plurality of reference beams in a frequency domain and communicate with the UE using at least one beam selected from the plurality of reference beams. The plurality of reference beams are beams transmitted based on a first scheme or a second scheme. The first scheme comprises transmitting N (wherein N is a natural number greater than or equal to 2) reference beams at a first transmission time, and transmitting the N reference beams at a second transmission time with an offset, and the second scheme may comprise transmitting 2N reference beams at either the first transmission time or the second transmission time, wherein the frequency spacing between the beams is half that of the N reference beams.

Figure 24:
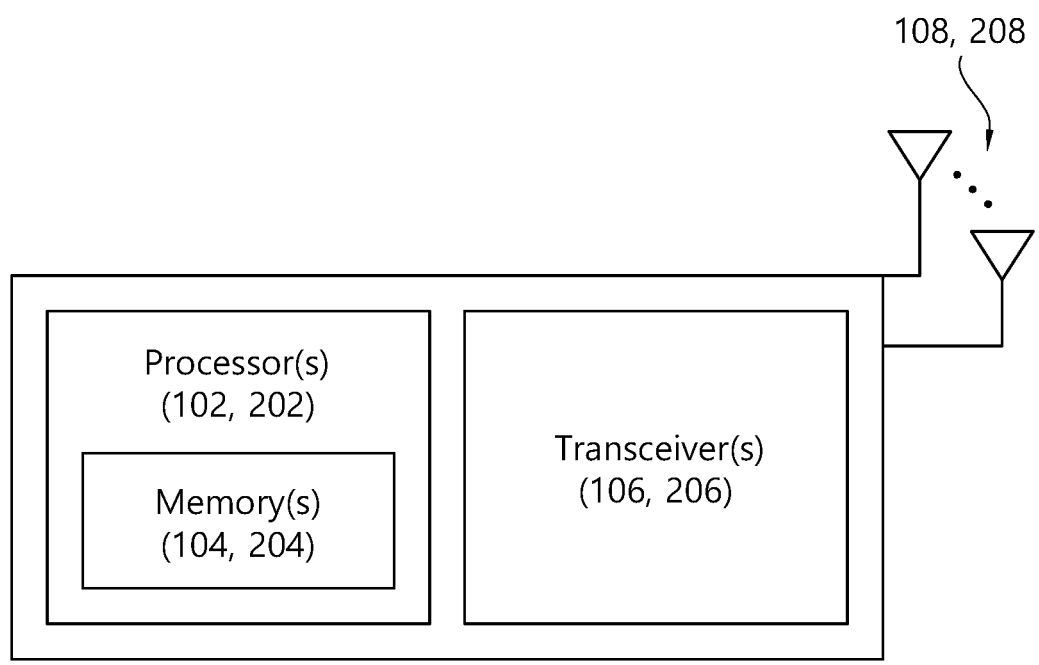
FIG. 24 illustrates another example of a wireless device that can be applied to the present disclosure.

FIG. 24 shows another example of a wireless device that can be applied to this specification.

Referring to FIG. 24, a wireless device may include at least one processor 102, 202, at least one memory 104, 204, at least one transceiver 106, 206, and one or more antennas 108, 208.

A difference between the wireless device example previously described in FIG. 23 and the wireless device example in FIG. 24 is that in FIG. 23, the processor 102, 202 and memory 104, 204 are separate, whereas in the example in FIG. 24, the processor 102, 202 includes memory 104, 204.

The aforementioned method may also be performed by a computer readable medium storing instructions causing the operation to be performed by one or more processors. The operations may include: measuring a plurality of reference beams in a frequency domain, selecting at least one beam of the plurality of reference beams and communicating with a base station using the selected at least one beam. The plurality of reference beams are beams transmitted based on a first scheme or a second scheme. The first scheme comprises transmitting N, the N being a natural number greater than or equal to 2, reference beams at a first transmission time and transmitting the N reference beams with an offset at a second transmission time. The second scheme comprises transmitting 2N reference beams and a second frequency spacing between adjacent beams in the 2N reference beams is half of a first frequency spacing between adjacent beams in the N reference beams.

Figure 25:
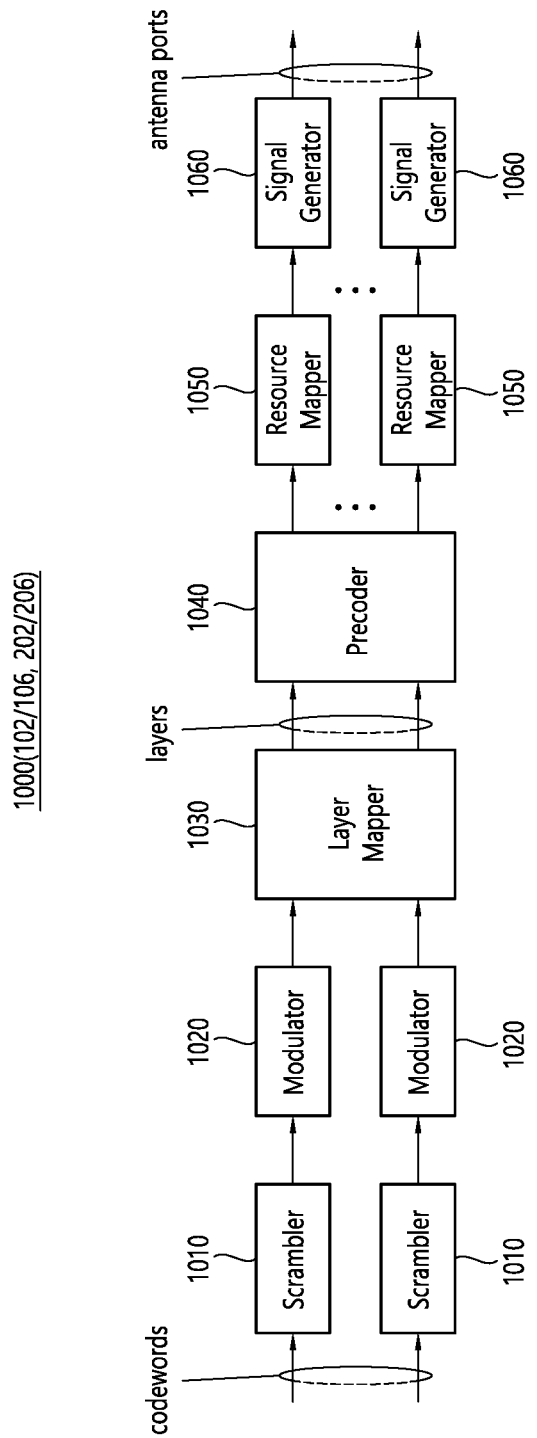
FIG. 25 illustrates a signal processing circuit for a transmission signal.

FIG. 25 exemplifies a signal processing circuit for a transmission signal.

Referring to FIG. 25, a signal processing circuit 1000 includes a scrambler 1010, a modulator 1020, a layer mapper 1030, a precoder 1040, a resource mapper 1050, and a signal generator 1060. The operations/functions of FIG. 25 may be performed in the processors 102 and 202 and/or the transceivers 106 and 206 of FIG. 23 but are not limited thereto. The hardware elements of FIG. 25 may be implemented in the processors 102 and 202 and/or the transceivers 106 and 206 of FIG. 23. For example, blocks 1010 to 1060 may be implemented in the processors 102 and 202 of FIG. 23. In addition, blocks 1010 to 1050 may be implemented in the processors 102 and 202 of FIG. 23, and block 1060 may be implemented in the transceivers 106 and 206 of FIG. 23.

A codeword may be converted into a wireless signal through the signal processing circuit 1000 of FIG. 25. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH) of FIG. 2.

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 25. For example, a wireless device (e.g., 100 or 200 in FIG. 23) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 26:
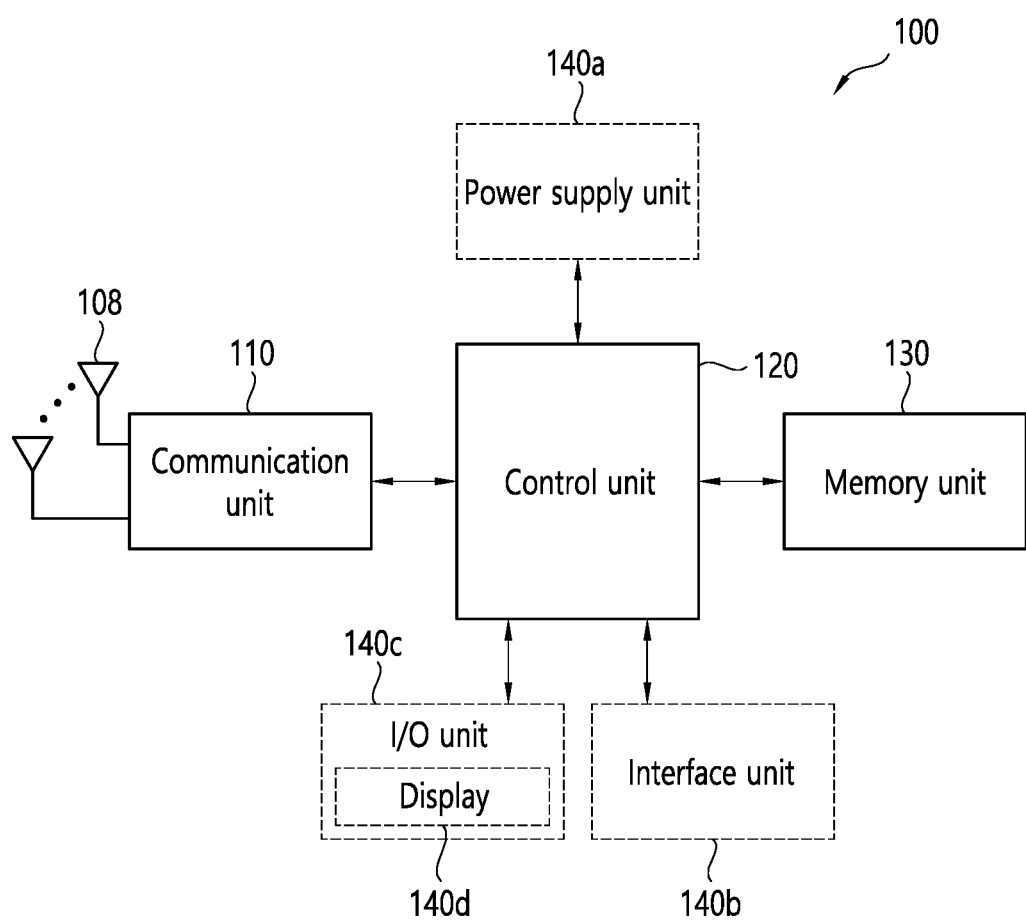
FIG. 26 illustrates a mobile device applicable to the present disclosure.

FIG. 26 illustrates a portable device applied to the present disclosure. The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 26, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports or video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140c.

The claims described herein may be combined in various ways. For example, a combination of the technical features of the method claims of this specification may be implemented as an apparatus, and a combination of the technical features of the apparatus claims of this specification may be implemented as a method. Further, a combination of technical features of the method claims of this specification and technical features of the apparatus claims of this specification may be implemented as an apparatus, and a combination of technical features of the method claims of this specification and technical features of the apparatus claims of this specification may be implemented as a method. Other implementations are within the scope of the following claims.

What is claimed is:

1. A method of operating a user equipment (UE) in a wireless communication system, the method comprising:
    measuring a plurality of reference beams in a frequency domain;
    selecting at least one beam of the plurality of reference beams; and
    communicating with a base station using the selected at least one beam,
    wherein the plurality of reference beams are beams transmitted based on a first scheme or a second scheme,
    wherein the first scheme comprises transmitting N, the N being a natural number greater than or equal to 2, reference beams at a first transmission time and transmitting the N reference beams with an offset at a second transmission time, and
    wherein the second scheme comprises transmitting 2N reference beams and a second frequency spacing between adjacent beams in the 2N reference beams is half of a first frequency spacing between adjacent beams in the N reference beams.

2. The method of claim 1, wherein in the first scheme, two adjacent reference beams in a frequency domain among the N reference beams intersect at 3 dB-beamwidth.

3. The method of claim 2, wherein the offset is related to ½ of the 3 dB-beamwidth.

4. The method of claim 2, wherein the 2N reference beams in the second scheme comprise i) the N reference beams of the first scheme, and ii) N other reference beams having power peak values at intersections of the N reference beams of the first scheme.

5. The method of claim 1, further comprising:
performing a downlink configured grant transmission or an uplink configured grant transmission in a multibeam duration.

6. The method of claim 5, wherein the multibeam duration is a duration in which a plurality of UEs, including the UE, and a base station communicate through a plurality of beams.

7. The method of claim 6, wherein, based on a plurality of multibeam durations being set, the downlink configured grant transmission or the uplink configured grant transmission is performed using same resources in each multibeam duration.

8. The method of claim 6, further comprising:
receiving extension information informing whether the multibeam duration is extended.

9. The method of claim 8, wherein, based on the extension information informing a specific value, a UE-specific scheduling duration located after the multibeam duration is regarded as the multibeam duration and operates.

10. The method of claim 5, wherein a UE-specific scheduling duration is located next to the multibeam duration, and
wherein the UE-specific scheduling duration is a time duration in which an entire available band can be allocated to a specific UE.

11. The method of claim 5, wherein in a UE-specific scheduling duration located after the multibeam duration, a plurality of beams can be used within a specific frequency band for a specific purpose.

12. The method of claim 5, wherein the multibeam duration and a UE-specific scheduling duration located after the multibeam duration are configurable by a base station.

13. A user equipment (UE) performing in a wireless communication system, the UE comprising:
at least one transceiver;
at least one memory; and
at least one processor operably coupled to the at least one memory,
wherein the at least one processor is adapted to:
measure a plurality of reference beams in a frequency domain;
select at least one beam of the plurality of reference beams; and
communicate with a base station using the selected at least one beam,
wherein the plurality of reference beams are beams transmitted based on a first scheme or a second scheme,
wherein the first scheme comprises transmitting N, the N being a natural number greater than or equal to 2, reference beams at a first transmission time and transmitting the N reference beams with an offset at a second transmission time, and
wherein the second scheme comprises transmitting 2N reference beams and a second frequency spacing between adjacent beams in the 2N reference beams is half of a first frequency spacing between adjacent beams in the N reference beams.

14. A method of operating a base station in a wireless communication system, the method comprising:
transmitting a plurality of reference beams in a frequency domain; and
communicating with a user equipment (UE) using selected at least one beam among the plurality of reference beams,
wherein the plurality of reference beams are beams that the base station transmits based on a first scheme or a second scheme,
wherein the first scheme comprises transmitting N, the N being a natural number greater than or equal to 2, reference beams at a first transmission time and transmitting the N reference beams with an offset at a second transmission time, and
wherein the second scheme comprises transmitting 2N reference beams and a second frequency spacing between adjacent beams in the 2N reference beams is half of a first frequency spacing between adjacent beams in the N reference beams.

* * * * *